US009701361B2

United States Patent
Lumpkin

(10) Patent No.: US 9,701,361 B2
(45) Date of Patent: *Jul. 11, 2017

(54) BICYCLE FRAME REAR SUSPENSION WITH FLEXING FRAME SEGMENT

(71) Applicant: Wayne Lumpkin, Littleton, CO (US)

(72) Inventor: Wayne Lumpkin, Littleton, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 15/149,414

(22) Filed: May 9, 2016

(65) Prior Publication Data
US 2016/0251053 A1    Sep. 1, 2016

Related U.S. Application Data

(63) Continuation of application No. 14/577,054, filed on Dec. 19, 2014, now Pat. No. 9,359,039.
(Continued)

(51) Int. Cl.
B62K 19/02    (2006.01)
B62K 25/28    (2006.01)
(Continued)

(52) U.S. Cl.
CPC ............ *B62K 25/28* (2013.01); *B62K 3/02* (2013.01); *B62K 19/00* (2013.01); *B62K 19/02* (2013.01);
(Continued)

(58) Field of Classification Search
CPC  B62K 2025/041; B62K 25/286; B62K 19/00; B62K 19/02; B62K 19/18;
(Continued)

(56) References Cited

U.S. PATENT DOCUMENTS

| 618,627 A | * | 1/1899 | Travis | .................. B62K 25/286 |
| | | | | 267/34 |
| 2,178,939 A | * | 11/1939 | Pease | ..................... B62K 25/04 |
| | | | | 280/283 |

(Continued)

FOREIGN PATENT DOCUMENTS

NL           3501      10/1917
WO    WO 2013/046236    4/2013

OTHER PUBLICATIONS

Cannondale_com_Admitted-prior-art_Scalpel_29_Carbon_Black_Ink Cannondale.com (Admitted prior art) Scalpel 29 Carbon Black Inc.; Website [Online] Available Web Site: http://www.ibiscycles.com/bikes/ripley_29/; Last Update: Unknown; Accessed on Apr. 25, 2014.

(Continued)

*Primary Examiner* — Anne Marie Boehler
(74) *Attorney, Agent, or Firm* — Swanson & Bratschun, L.L.C.

(57) ABSTRACT

A bicycle frame includes a substantially rigid front frame portion and a substantially rigid rear frame portion. A link is connected to the rear frame portion by a first pivot and to the front frame portion by a second pivot. A frame segment is rigidly connected at a first end to one of the rear frame portion and the front frame portion and pivotably connected at a second end to other of the rear frame portion or the front frame portion by a third pivot. The frame segment is flexible proximate the second end.

18 Claims, 34 Drawing Sheets

Related U.S. Application Data

(60) Provisional application No. 61/919,833, filed on Dec. 23, 2013.

(51) Int. Cl.
*B62K 19/00* (2006.01)
*B62K 3/02* (2006.01)
*B62K 19/18* (2006.01)
*B62K 19/16* (2006.01)
*B62K 25/04* (2006.01)

(52) U.S. Cl.
CPC .............. *B62K 19/16* (2013.01); *B62K 19/18* (2013.01); *B62K 25/286* (2013.01); *B62K 2025/041* (2013.01)

(58) Field of Classification Search
CPC ........ B62K 19/30; B62K 25/10; B62K 25/28; B62K 3/02; B62K 19/10; B62K 19/16
USPC .......................... 280/283, 284, 285, 286, 275
See application file for complete search history.

(56) References Cited

U.S. PATENT DOCUMENTS

| | | | |
|---|---|---|---|
| 2,283,671 A * | 5/1942 | Finlay .................... | B62K 25/14 280/276 |
| 4,838,569 A * | 6/1989 | Ford ........................ | B62J 1/06 280/275 |
| 4,856,801 A | 8/1989 | Hollingsworth | |
| 5,080,384 A * | 1/1992 | Groendal ............... | B62K 19/02 280/275 |
| 5,098,114 A | 3/1992 | Jones | |
| 5,205,572 A | 4/1993 | Buell | |
| 5,240,269 A | 8/1993 | Kerr | |
| 5,244,224 A | 9/1993 | Busby | |
| 5,284,354 A | 2/1994 | McWethy | |
| 5,301,974 A | 4/1994 | Knapp | |
| 5,320,375 A | 6/1994 | Reeves | |
| 5,403,028 A | 4/1995 | Trimble | |
| 5,452,910 A | 9/1995 | Harris | |
| 5,474,318 A | 12/1995 | Castellano | |
| 5,553,881 A | 9/1996 | Klassen | |
| 5,628,524 A | 5/1997 | Klassen | |
| 5,791,674 A | 8/1998 | D'Aluisio | |
| 5,957,473 A | 9/1999 | Lawwill | |
| 6,076,845 A * | 6/2000 | Lawwill .................. | B62K 25/30 280/284 |
| 6,092,823 A * | 7/2000 | Busby .................... | B62K 19/18 267/269 |
| 6,199,886 B1 | 3/2001 | Guenther | |
| 6,293,574 B1 | 9/2001 | Storck | |
| 6,361,059 B1 | 3/2002 | Ellsworth | |
| 6,386,568 B1 | 5/2002 | Tribotte | |
| 6,406,048 B1 | 6/2002 | Castellano | |
| 6,450,520 B1 | 9/2002 | Girard | |
| 6,581,950 B1 | 6/2003 | Ellsworth | |
| 6,755,432 B2 | 6/2004 | Muser | |
| 6,783,142 B1 * | 8/2004 | Schober ................. | B62K 25/28 280/283 |
| 6,843,494 B2 | 1/2005 | Lam | |
| 6,886,846 B2 | 5/2005 | Carroll | |
| D523,380 S | 6/2006 | Auger | |
| 7,066,481 B1 | 6/2006 | Soucek | |
| 7,100,930 B2 | 9/2006 | Saiki | |
| 7,140,628 B2 | 11/2006 | Parkin | |
| 7,168,726 B2 | 1/2007 | Klein | |
| 7,216,883 B2 | 5/2007 | O'Connor | |
| 7,395,892 B2 | 7/2008 | Alonzo | |
| 7,533,895 B2 * | 5/2009 | Beal ........................ | B62K 25/04 280/276 |
| 7,635,141 B2 | 12/2009 | O'Connor | |
| 7,722,072 B2 | 5/2010 | Hoogendoorn | |
| 7,753,388 B2 * | 7/2010 | Tolhurst ................. | B62K 3/005 280/276 |
| 7,828,314 B2 | 11/2010 | Weagle | |
| 7,837,213 B2 | 11/2010 | Colegrove | |
| 7,909,347 B2 | 3/2011 | Earle | |
| 7,938,424 B2 | 5/2011 | Arraiz | |
| 7,946,605 B2 | 5/2011 | Lane | |
| 7,980,579 B2 | 7/2011 | Buckley | |
| 8,002,301 B2 | 8/2011 | Weagle | |
| 8,033,558 B2 | 10/2011 | Earle | |
| 8,061,729 B2 | 11/2011 | White | |
| 8,066,297 B2 | 11/2011 | Beale | |
| 8,136,829 B1 | 3/2012 | Kang | |
| 8,152,191 B2 | 4/2012 | Huang | |
| 8,235,409 B2 | 8/2012 | Colegrove | |
| 8,272,658 B2 | 9/2012 | Hoogendoorn | |
| 8,286,982 B2 | 10/2012 | Plantet | |
| 8,348,295 B2 | 1/2013 | Beaulieu | |
| 8,382,136 B2 | 2/2013 | Beale | |
| 8,403,350 B2 | 3/2013 | Talavasek | |
| 8,424,893 B2 * | 4/2013 | Guillemette ............... | B62J 1/08 280/283 |
| 8,434,776 B2 | 5/2013 | Wuthrich | |
| 8,585,070 B2 * | 11/2013 | Beale .................... | B62K 25/286 280/284 |
| 8,590,914 B2 | 11/2013 | Domahidy | |
| 9,156,521 B2 * | 10/2015 | Lumpkin ............... | B62K 19/00 |
| 9,359,039 B2 * | 6/2016 | Lumpkin ............... | B62K 19/00 |
| 2005/0285367 A1 | 12/2005 | Chang | |
| 2006/0061059 A1 | 3/2006 | Lesage | |
| 2006/0119070 A1 | 6/2006 | Weagle | |
| 2008/0217882 A1 | 9/2008 | Beaulieu | |
| 2008/0258427 A1 | 10/2008 | Buckley | |
| 2008/0303242 A1 | 12/2008 | O'Connor | |
| 2009/0026728 A1 * | 1/2009 | Domahidy ........... | B62K 25/286 280/284 |
| 2009/0072512 A1 | 3/2009 | Earle | |
| 2009/0250897 A1 | 10/2009 | Tanouye | |
| 2009/0261556 A1 | 10/2009 | Beale | |
| 2009/0261557 A1 | 10/2009 | Beale | |
| 2009/0322055 A1 | 12/2009 | Arraiz | |
| 2010/0059965 A1 | 3/2010 | Earle | |
| 2010/0096831 A1 | 4/2010 | Tanouye | |
| 2010/0102531 A1 | 4/2010 | Graney | |
| 2010/0109282 A1 | 5/2010 | Weagle | |
| 2010/0156066 A1 | 6/2010 | O'Connor | |
| 2011/0018228 A1 | 1/2011 | Beale | |
| 2011/0025015 A1 | 2/2011 | Colegrove | |
| 2011/0095507 A1 | 4/2011 | Plantet | |
| 2011/0193316 A1 * | 8/2011 | Earle .................... | B62K 25/286 280/284 |
| 2011/0227312 A1 | 9/2011 | Earle | |
| 2011/0233892 A1 | 9/2011 | Domahidy | |
| 2011/0233893 A1 | 9/2011 | Buckley | |
| 2011/0278817 A1 | 11/2011 | Talavasek | |
| 2011/0291382 A1 | 12/2011 | Plantet | |
| 2012/0007327 A1 | 1/2012 | Talavasek | |
| 2012/0130591 A1 | 5/2012 | Song | |
| 2012/0187653 A1 | 7/2012 | Edgeworth | |
| 2012/0223504 A1 | 9/2012 | Antonot | |
| 2012/0228850 A1 | 9/2012 | Tseng | |
| 2012/0235379 A1 | 9/2012 | Trimble | |
| 2012/0280470 A1 | 11/2012 | Colegrove | |
| 2012/0326416 A1 | 12/2012 | Talavasek | |
| 2013/0093160 A1 | 4/2013 | Alsop | |
| 2013/0214507 A1 | 8/2013 | O'Connor | |
| 2013/0285346 A1 | 10/2013 | Wimmer | |
| 2014/0001729 A1 | 1/2014 | Hudec | |

OTHER PUBLICATIONS

Castellano_Designs_2003_Fango Castellano Designs (2003) Fango; Website [Online] Available Web Site: http://www.castellanodesigns.com/fango.html; Last Update: Aug. 24, 2013; Accessed on Apr. 25, 2014.

English Language Search Reoprt from GB142032.0 dated Jun. 18, 2015.

Felt_Bicycles_2013_Felt_Suspension_Technology Felt Bicycles (2013) Felt Suspension Technology; Website [Online] Available

(56) References Cited

OTHER PUBLICATIONS

Web Site: http://www.feltbicycles.com/assest_img/technology_docs/Suspension.pdf; Last Update: Sep. 5, 2013; Accessed on Apr. 25, 2014.
IBIS_Bikes_2012_Ripley_29 IBIS Bikes (2012) Ripley 29; Website [Online] Available Web Site: http://www.ibiscycles.com/bikes/ripley_29/; Last Update: Feb. 19, 2014; Accessed on Apr. 25, 2014.
Marin_Bikes_2013_IsoTrac_Suspension Marin Bikes (2013) IsoTrac Suspension; Website [Online] Available Web Site: http://www.marinbikes.com/us/bikes/feature/isotrac-suspension; Last Update: Sep. 26, 2013; Accessed on Apr. 25, 2014.
Notice of Allowance from U.S. Appl. No. 14/244,496 dated Jul. 29, 2015.
Notice of Allowance from U.S. Appl. No. 14/577,054 dated Apr. 11, 2016.
Office Action from DE 10 2014 019 525.2 dated Dec. 22, 2015, with English translation.
Office Action from U.S. Appl. No. 14/244,496 dated Apr. 1, 2015.
Office Action from U.S. Appl. No. 14/577,054 dated Jul. 27, 2015.
Office Action from U.S. Appl. No. 14/577,054 dated Feb. 8, 2016.

\* cited by examiner

BICYCLE FRAME REAR SUSPENSION WITH FLEXING FRAME SEGMENT

RELATED APPLICATIONS

This application is a continuation of U.S. patent application Ser. No. 14/577,054, filed Dec. 19, 2014, which claims priority from U.S. Provisional Patent Application No. 61/919,833, filed Dec. 23, 2013, each entitled "Bicycle Frame Rear suspension with Flexing Frame Segment," each of which is hereby incorporated by reference.

The present disclosure may also be related to the following commonly assigned application: U.S. patent application Ser. No. 14/244,496, filed Apr. 3, 2014, entitled "Bicycle Frame Rear Suspension with Flexing Frame Segment", which is incorporated herein by reference in its entirety.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The present invention is directed toward bicycles, and more particularly toward a bicycle frame rear suspension.

BACKGROUND

Rear suspensions have become commonplace in off-road bicycles such as mountain bikes. Rear suspensions allow the rear wheel to pivot upward relative to a forward portion of the bicycle frame to damp and absorb the impact of off-road features such as rocks commonly found on mountain biking trails. Such rear suspension frames typically include a rigid front frame portion pivotally connected to a rear frame portion functioning as a swing arm pivoting about a pivot or pivots between the front frame portion and the rear frame portion. Typically a spring or shock absorber is connected between the front frame portion and the rear frame portion to bias the rear frame portion to a rest or un-pivoted position relative to the front frame portion and to absorb or damp pivoting of the rear frame portion about the pivot(s) as an obstacle is encountered. One known problem with many rear suspension systems is that as a rider pedals, the shifting of the rider's weight and variations in chain force causes the suspension to bob, a condition commonly known as "pedal bob", wasting rider energy and potentially causing a loss of traction for the rear wheel. In an effort to minimize pedal bob, a variety of bicycle frame rear suspensions have been devised, many of which incorporate a number of pivots and links. These various bicycle frame rear suspensions have varying success in minimizing pedal bob while maintaining pedaling efficiency. However, the additional pivots and links these rear suspensions require add weight and cost to the bicycle frame and create maintenance issues as invariably grit invades the pivots creating annoying creaks and increasing wear of the pivots. Thus, a need exists for a bicycle rear suspension frame which reduces pedal bob and maintains pedaling efficiency while reducing the number of links and pivots in the rear suspension.

The present invention is directed toward overcoming one or more of the problems discussed above.

SUMMARY OF THE EMBODIMENTS

A bicycle frame includes a substantially rigid front frame portion and a substantially rigid rear frame portion. A link is connected to the rear frame portion by a first pivot and to the front frame portion by a second pivot. A frame segment is rigidly connected at a first end to the rear frame portion and pivotably connected at a second end to the front frame portion by a third pivot. The frame segment is flexible parallel to an axis of the third pivot.

Embodiments may further include a shock absorber pivotably connected between the rear frame portion and the front frame portion to oppose pivoting of the rear frame portion relative to the front frame portion in a clockwise direction about the third pivot. Embodiments may include the first pivot floating in an arc about the second pivot which is fixed relative to the front frame portion as the rear frame portion pivots relative to the front frame portion about the third pivot. The frame segment is configured to flex to enable the first pivot to move in the arc about the second pivot as the frame segment pivots about the third pivot between a rest position and a fully pivoted position. Embodiments include the frame segment behaving as a leaf spring as it flexes, with the frame segment being configured to provide a spring force that varies between opposing and promoting pivoting of the rear fame portion about the third pivot as the rear frame portion is pivoted about the third pivot from a rest position to a fully pivoted position. Embodiments include the frame segment being integrally formed with the rear frame portion. Embodiments include the frame segment being substantially laterally rigid.

A further embodiment may comprise a bicycle frame including a substantially rigid front frame portion and a substantially rigid rear frame portion. A link is connected to the rear frame portion by a first pivot and to the front frame portion by a second pivot. A frame segment is rigidly connected at a first end to one of the rear frame portion or the front frame portion and pivotably connected at a second end to the other of the rear frame portion or the front frame portion by a third pivot. The frame segment is flexible parallel to an axis of the third pivot.

Various modifications and additions can be made to the embodiments discussed without departing from the scope of the invention. For example, while the embodiments described above refer to particular features, the scope of this invention also included embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

While various aspects and features of certain embodiments have been summarized above, the following detailed description illustrates a few embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described and claimed herein, and while various features are ascribed to different embodiments, it should be appreciated that the features described with respect to one embodiment may be incorporated with other embodiments as well. By the same token, however, no single feature or features of any described or claimed embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Figure 1:
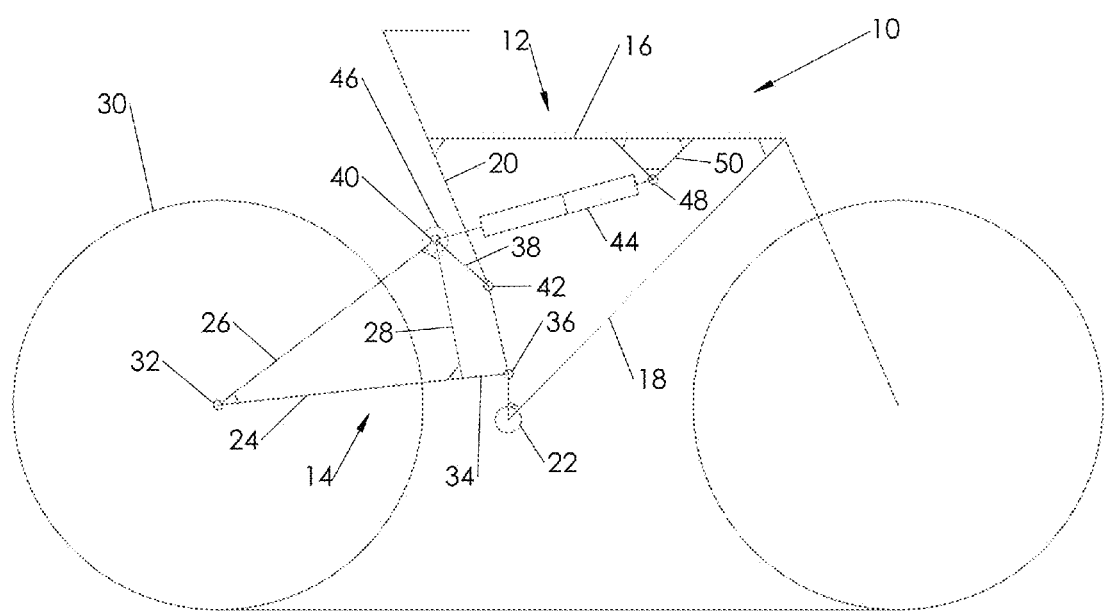
FIG. 1 is a schematic right side elevation view of a bicycle frame having a rear suspension with a flexing frame segment shown in a rest position.

FIG. 1 is a schematic representation of a bicycle frame 10 having a rear suspension with a flexing frame segment. The bicycle frame 10 comprises a substantially rigid front frame portion 12 and a substantially rigid rear frame portion 14. The front frame portion 12 includes a top tube 16 rigidly connected to a down tube 18 and a seat tube 20 which in turn are rigidly connected to each other at a bottom bracket shell 22. As used herein "substantially rigid" means the various frame members are rigidly connected and the various frame members themselves are sufficiently rigid that the frame portion cannot yield or deform significantly under normal usage, wherein the frame portion maintains its shape when under operative loads, for example, the shape depicted in FIG. 1.

The substantially rigid rear frame portion 14 includes a chain stay 24 rigidly connected at a proximal end to a proximal end of a seat stay 26, each of which are rigidly connected to a bridge stay 28 at their distal ends. The chain stay 24 and the seat stay 26 can consist of chain stay and seat stay pairs configured to receive a bicycle wheel 30 therebetween (see FIG. 33). The proximal ends of the chain stay 24 and the seat stay 26 may be rigidly attached to an axle housing 32 which receives an axle of the wheel 30. Alternate embodiments of the front and rear frames are expressly included within the scope of the invention. For example, the front and rear frame portions do not necessarily have to be in the form of a triangle as illustrated herein. The rear frame portion may have any configuration that renders the rear frame substantially rigid so that it acts as a swing arm in the various embodiments disclosed herein.

The rear frame portion 14 further includes a frame segment 34 which may be fixedly attached to the substantially rigid rear frame. The frame segment 34 can be integrally formed with the rear frame, for example, when the rear frame portion 14 is made of a composite material or may be rigidly connected by welding, bolting or otherwise fixedly attached when the rear frame portion 14 is made of metal. Alternatively, the frame segment may be fixedly attached to the substantially rigid front frame portion.

The substantially rigid rear frame portion 14 is attached to the substantially rigid front frame portion 12 in a manner providing the rear suspension. As depicted in FIG. 1, a link 38 extends between a first pivot 40 near the connection between the bridge stay 28 and the seat stay 26 and a second pivot 42 attached to the front frame portion 12 above a third or bottom pivot 36 and below and in front of the first pivot 40. The frame segment 34 is pivotably attached at the third pivot 36 to the seat tube 20 near the bottom bracket shell 22.

Alternatively, in an embodiment where the frame segment is rigidly attached to the front frame portion, the frame segment is pivotably attached at the third pivot to the rear frame portion near the bottom of the bridge stay 28. A shock absorber 44 extends between the substantially rigid front frame portion 12 and rear frame portion 14 and is pivotably connected at a first shock pivot 46 to the substantially rigid rear frame portion 14 proximate the connection of the seat stay 26 and the bridge stay 28 and pivotably connected to the front frame portion at second shock pivot 48 connected to a bracket 50 which is in turn fixedly attached to the top tube 16. Embodiments could substitute a spring or other elastic element for the shock absorber 44, and "shock absorber" is intended herein to include all such substitutes as well as conventional shock absorbers.

In certain embodiments the frame segment 34 functions as a leaf spring and is configured to be laterally rigid but flexible parallel to an axis of the third pivot 36. In one embodiment, the frame segment 34 may be made of a plate of metal, for example spring steel or titanium. In another embodiment, the frame segment may be made of a composite material. In an embodiment where the rear frame portion 14 is fabricated from composite materials, the frame segment 34 may be integrally made with the rear frame portion (or alternatively the front frame portion) of a fiber reinforced composite. The operation of the frame segment 34 acting as a leaf spring will be described in greater detail below.

Figure 2:
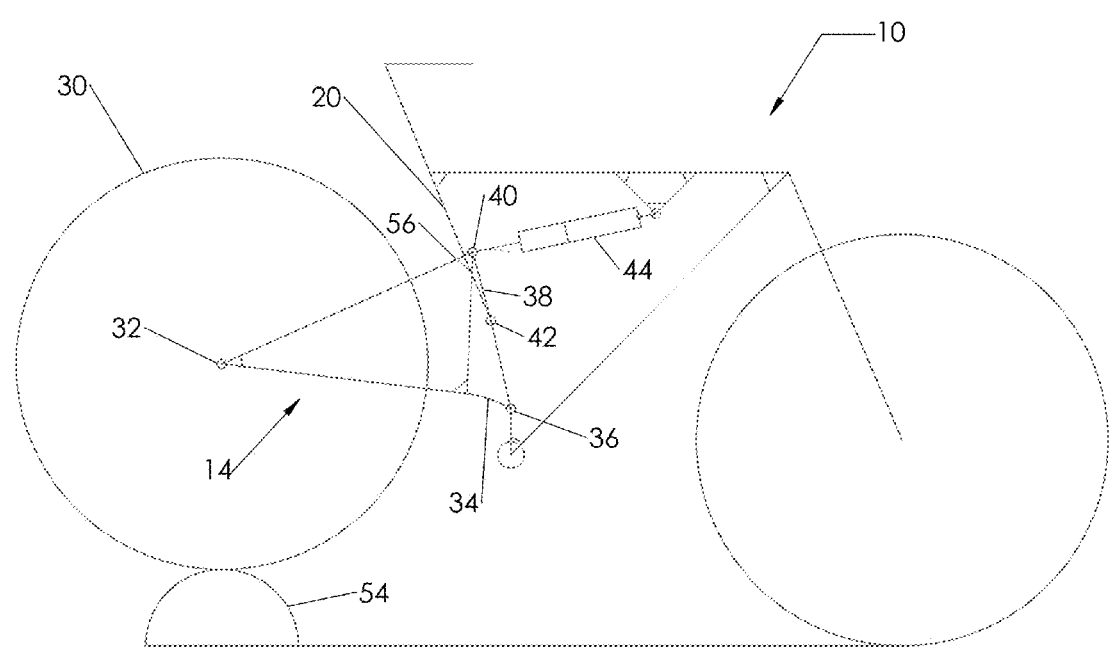
FIG. 2 is a schematic representation of the bicycle frame of FIG. 1 with the rear frame portion partially pivoted clockwise about a pivot relative to the front frame portion.
Figure 4:
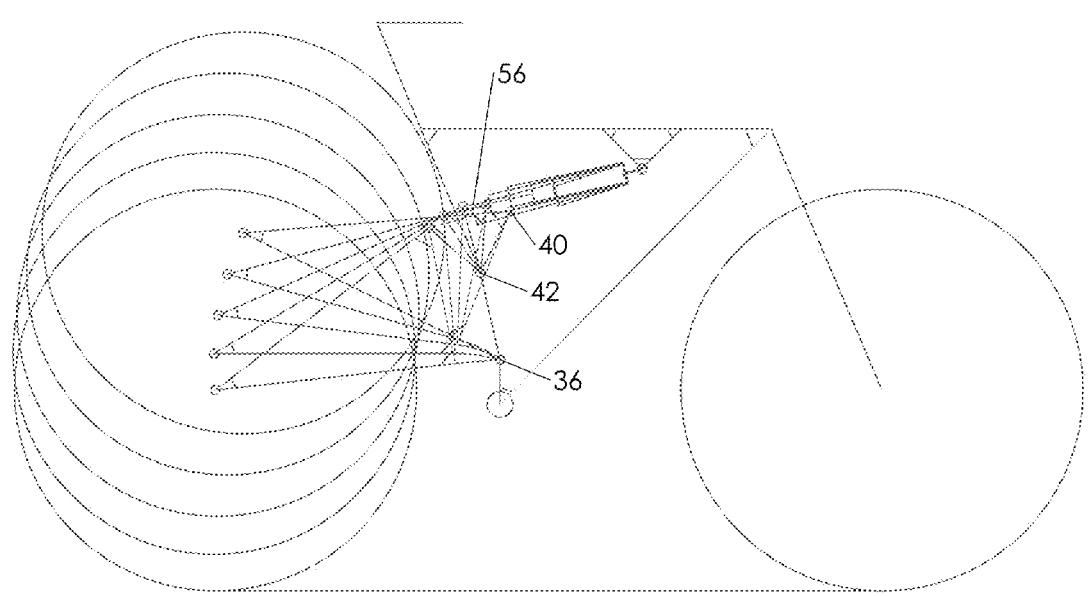
FIG. 4 is a schematic representation of the bicycle frame of FIG. 1 illustrating an arc of travel of a floating pivot as the rear suspension travels from a rest to a fully pivoted position.

FIG. 2 illustrates the bicycle frame 10 of FIG. 1 where the rear wheel 30 encounters an obstacle 54 causing the rear frame portion 14 to pivot clockwise about the third pivot 36 to a partially actuated position. The pivoting of the rear frame portion in turn causes link 38 to pivot clockwise about the second pivot 42. In effect, the second pivot 42 is fixed and the first pivot 40 floats along an arc 56 (see FIG. 4). To enable this movement, the flexible frame segment 34 flexes as depicted in FIG. 2. As the effective distance between the first pivot 40 and the third pivot 36 increases from the rest position to the partially actuated position as illustrated in FIG. 2, the flexible frame segment exerts a spring force opposing rotation of the rear frame portion about the third pivot 36.

Figure 3:
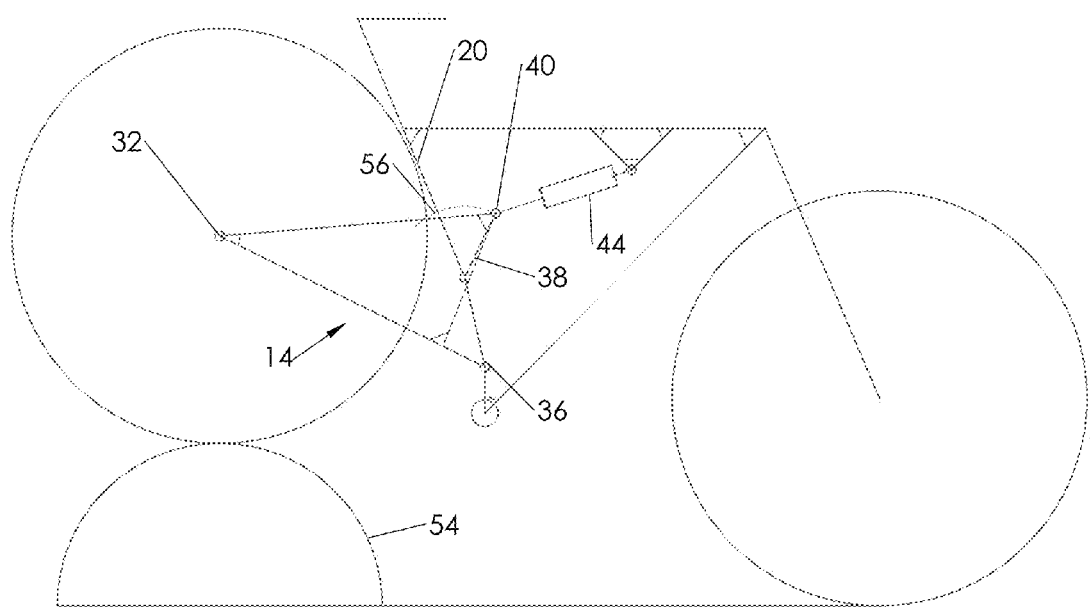
FIG. 3 is a schematic representation of the bicycle frame of FIG. 1 with the rear frame portion in a fully pivoted position about the pivot relative to the front frame portion.

FIG. 3 depicts the bicycle frame 10 where the rear wheel 30 has encountered a larger obstacle 54 and shows the rear frame portion 14 in a fully pivoted position clockwise about the third pivot 36. Here the first pivot 40 has traveled to the fully pivoted end of the arc 56. In this position the flexible frame segment 34 is returned to a near-planar or non-flexed configuration as the distance between the first pivot 40 and the third pivot 36 is nearly the same as it is at the start of the arc 56 in a rest position.

Figure 5:
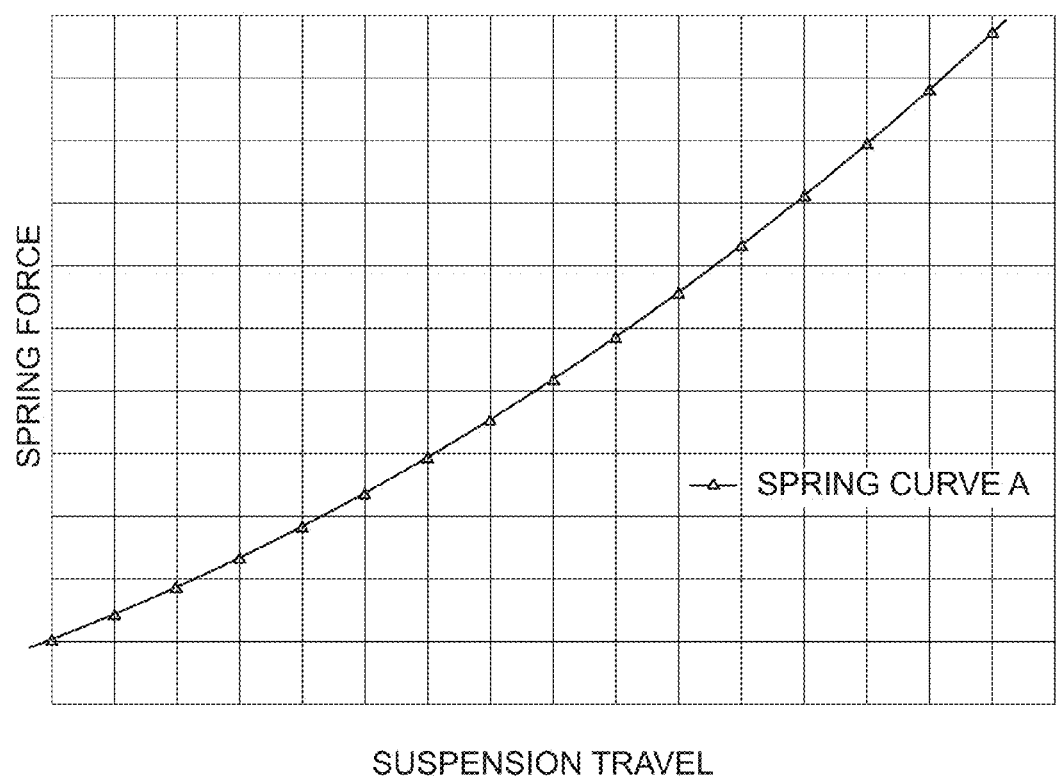
FIG. 5 is a graph representative of spring force versus suspension travel provided by the shock absorber in association with the bicycle frame depicted in FIG. 1.
Figure 6:
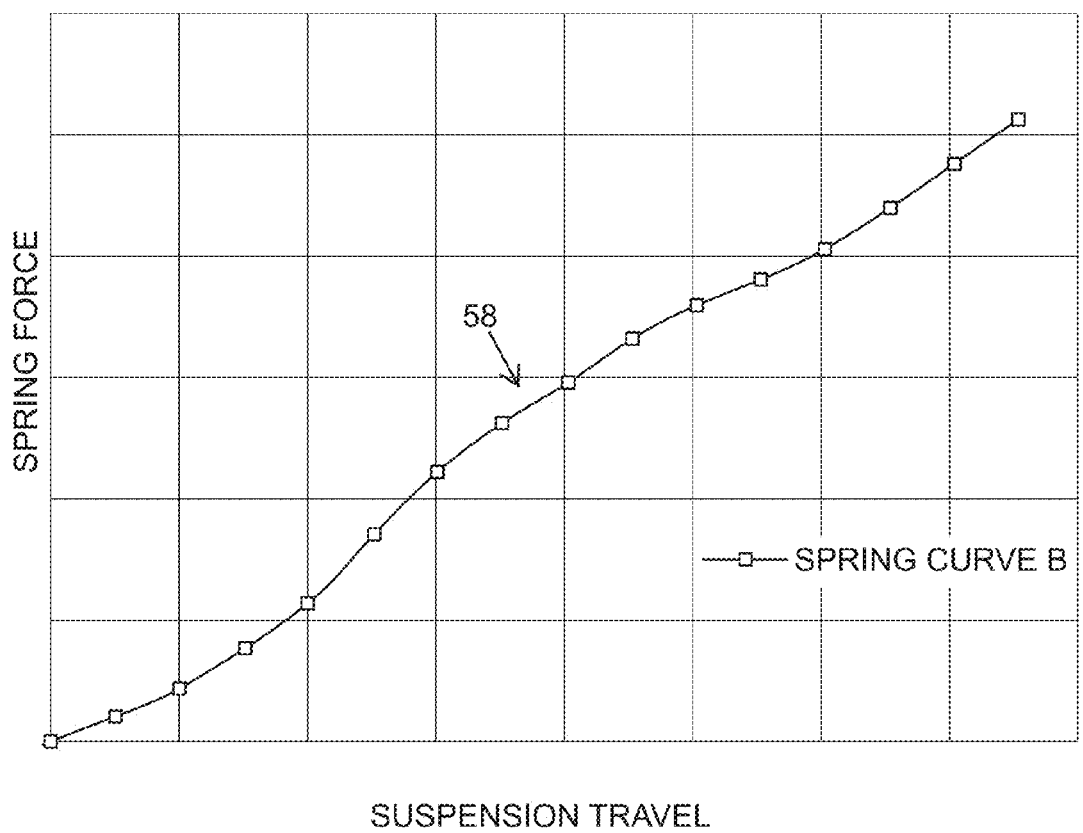
FIG. 6 is a graph representative of spring force versus suspension travel provided by a flexible segment of the rear frame portion of FIG. 1 in combination with the spring force of the shock absorber depicted in FIG. 5 (which is not necessarily at the same scale as the graph of FIG. 5)

In this embodiment, as the rear frame portion 14 pivots clockwise about the third pivot 36 the shock absorber 44 compresses and applies a spring force opposing clockwise rotation for the rear frame portion. FIG. 5 is a graph representing an anticipated spring curve of spring force applied by the shock absorber 44 as a function of the suspension travel, which herein is defined as the vertical distance traveled by the axle housing 32 as the rear frame portion 14 pivots about the third pivot 36. The spring force depicted in FIG. 5 assumes the flexing of the flexible frame segment 34 does not result in any spring force. However, as noted above, in certain embodiments such as that illustrated in FIGS. 1-4, the flexing of the frame segment 34 does impart a spring force to the suspension. In the embodiments of FIGS. 1-4, as the flexible frame segment 34 flexes as the first pivot 40 travels the arc 56 to the crown of the arc 56, it imparts a spring force opposing rotation of the rear frame portion 14 about the third pivot 36 to the point 58 depicted in FIG. 6, which corresponds to a crown of the arc 56 about the second pivot 42 and will also depict a point called "top dead center" or "TDC" where the first, second and third pivots are substantially linearly aligned. FIG. 5 and FIG. 6 are representative of anticipated spring curves of the respective elements and are not in any particular scale relative to one another. As used herein, "crown" means a point of maximum distance of the first pivot 40 from the third pivot 36. In other embodiments, for example where the pivots of the link 38 are configured such that the first pivot 40 moves in an arc wherein at a mid-point of travel it is at a closest distance from the third pivot 36, the "crown" would correspond that point on the arc of closest distance causing a change in a spring effect provided by the flexible frame segment 34. In the embodiment depicted in FIGS. 1-4, after the first pivot 40 crosses the crown and continues along the arc to the fully pivoted position, the flexible frame segment 34 provides a spring force that promotes pivoting of the rear frame portion about the third pivot as the flexible frame segment 34 straightens until the rear frame portion 14 reaches its fully pivoted position depicted in FIG. 3. The configuration of the pivots and flexible frame segment 34 with the geometry illustrated in FIGS. 1-4, along with the flexible frame segment behaving as a leaf spring, has the desirable effect of increasing the spring force at the outset of suspension travel, which helps resist pedal bob as a rider pedals, providing a more efficient pedal stroke. However, as large obstacles 54 are encountered by the rear wheel 30 suspension travel increases resulting in the first pivot 40 traveling along the arc 56 past the crown with respect to the second pivot 42, and thereafter the flexible frame segment 34 acts to promote pivoting of the rear frame portion 14 about the third pivot 36 to provide a more plush feel to the user, as is desirable when large obstacles 54 are encountered. This combined effect can be viewed in the spring curve depicted in FIG. 6.

In the embodiment of the bicycle frame 10 depicted in FIGS. 1-4, the flexible frame segment is substantially parallel with an imaginary line between the axle housing 32 (or a junction between the seat stay and the chain stay) and the third pivot 36. Other embodiments could have the frame segment 34 at an angle to this imaginary line between the axle housing and the third pivot as desired to provide different suspension effects. Furthermore, as depicted the first pivot 40 attached to the frame segment 34 is above and rearward relative to the second pivot 42 attached to the front frame portion 12. Embodiments could have the first pivot 40 below and rearward of the second pivot 42 to vary the spring curve. Embodiments could also include configuration of the pivots and the frame segment 34 to provide a spring force opposing rotation of the rear frame portion 14 about the third pivot 36 from a rest position to a fully pivoted position. Embodiments could further include configurations wherein the frame segment to provides a spring force promoting rotation of the rear frame portion 14 about the third pivot 36 from a rest position to a fully pivoted position. Embodiments could further include configurations wherein the frame segment provides a spring force promoting rotation of the rear frame portion 14 about the third pivot 36 from a rest position a select point along the arc 56 and thereafter a spring force opposing rotation of the rear frame portion 14. These various embodiments will have varying effects on reducing pedal bob as compared to the embodiment described with respect to FIGS. 1-4.

Figure 7:
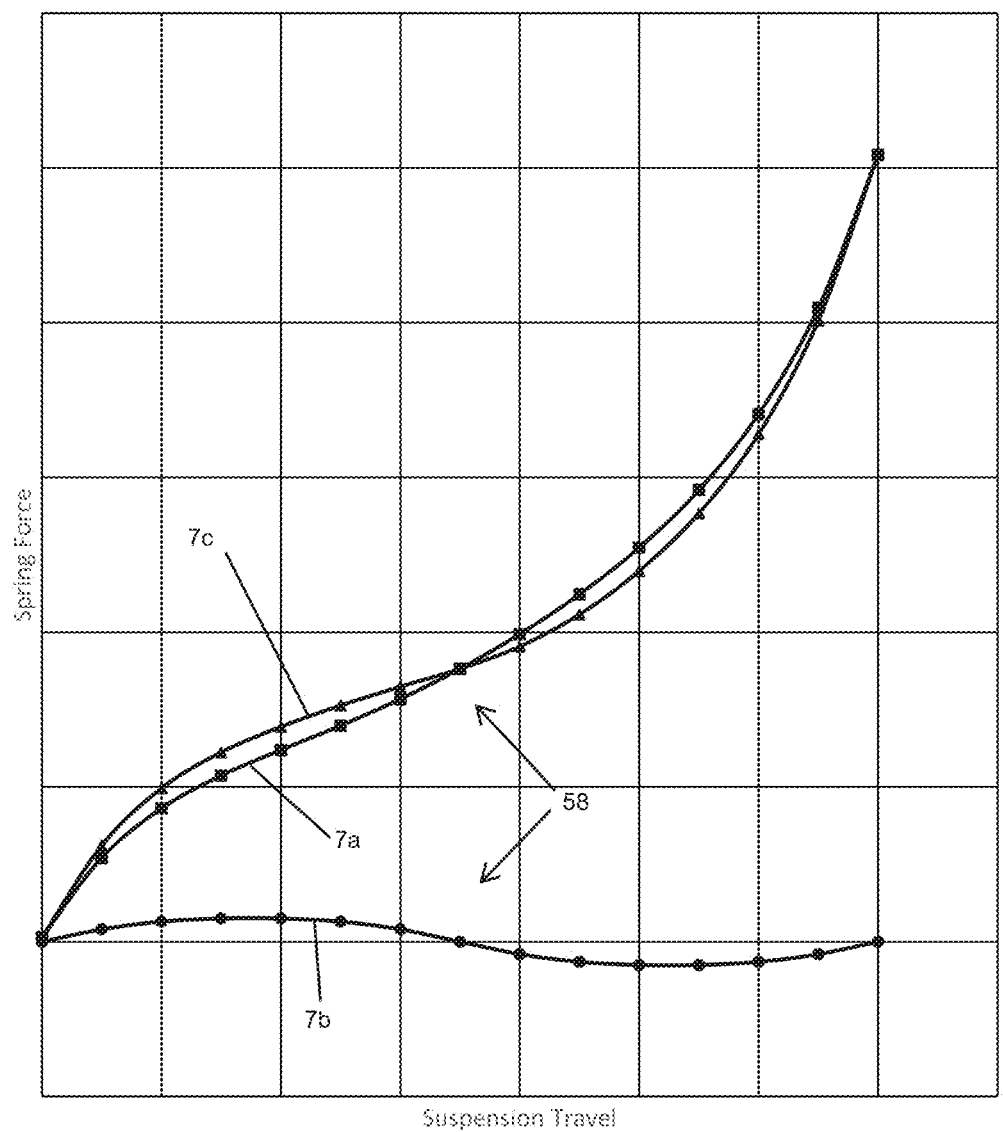
FIG. 7 is a graph showing spring force versus suspension travel curves of the embodiment of FIG. 1 provided by the shock only, the frame segment only and the combination of shock absorber and the frame segment more accurately the spring force curves of the rear suspension illustrated in FIGS. 5 and 6.

Further study of the spring force versus suspension travel of the embodiment of a bicycle frame 10 illustrated in FIGS. 1-4 revealed spring force curves somewhat different than those illustrated in the conceptual spring force curves depicted in FIGS. 5 and 6. FIG. 7 more accurately depicts the spring force curves of the rear suspension described with respect to FIGS. 1-4. Curve 7a represents the spring force applied to the suspension system by the shock absorber 44 only as the rear suspension pivots between the rest position illustrated in FIG. 1 and the fully pivoted position illustrated in FIG. 3. Curve 7b depicts the spring force on the suspension system provided by just the frame segment 34 behaving as a leaf spring. Curve 7c illustrates the combined effective spring force of the shock absorber 44 and the frame segment 34 on the suspension system. As described above with respect to FIGS. 5 and 6, between a rest position and the position where the second pivot 42 is at the crown of the arc 56, the frame segment increases the combined spring force above that of the shock only, opposing pivoting of the rear frame portion 14 clockwise about the third pivot 36. When the first pivot swings clockwise from the crown, or over top dead center, as illustrated at 58 in FIG. 7, the leaf spring straightens and provides a negative spring force promoting clockwise rotation of the rear frame portion 14 about the third pivot 36, causing the combined spring force to be less than that provided by the shock absorber alone.

Figure 8:
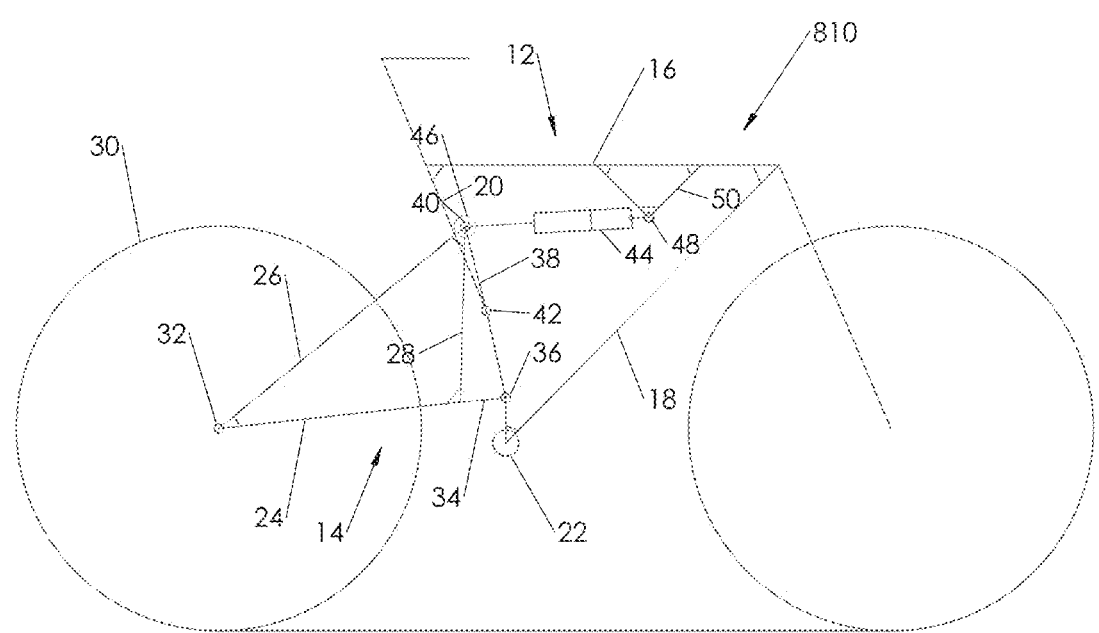
FIG. 8 is a schematic right side elevation view of a second embodiment of a bicycle frame having a rear suspension with the flexing segment shown in a rest position.
Figure 9:
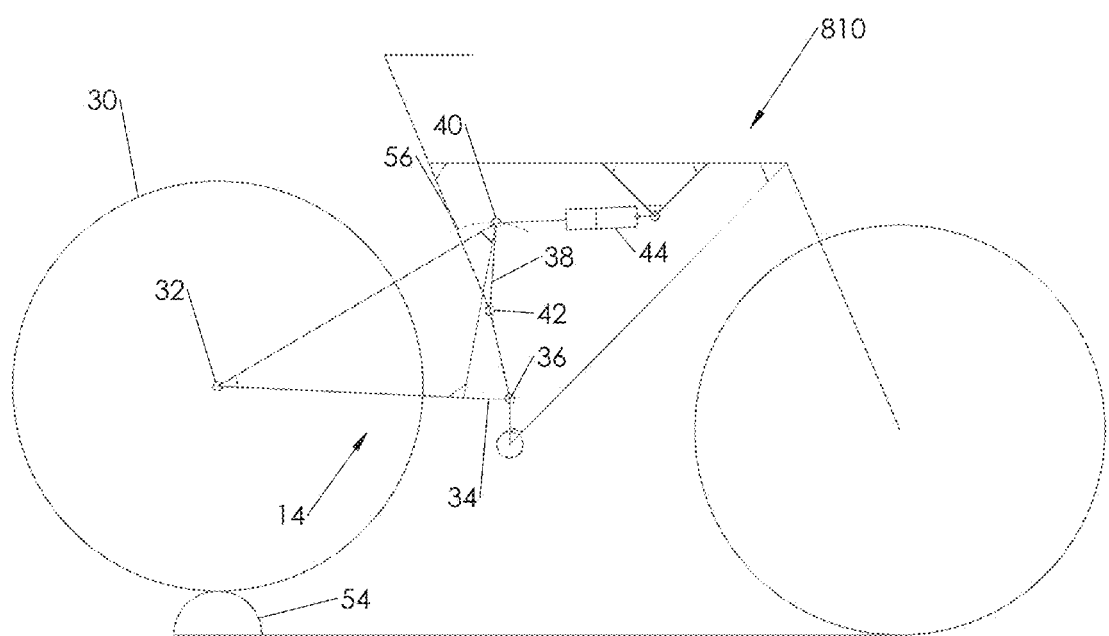
FIG. 9 is a schematic representation of the bicycle frame of FIG. 8 with the rear frame partially pivoted clockwise about a pivot relative to the front frame portion.
Figure 10:
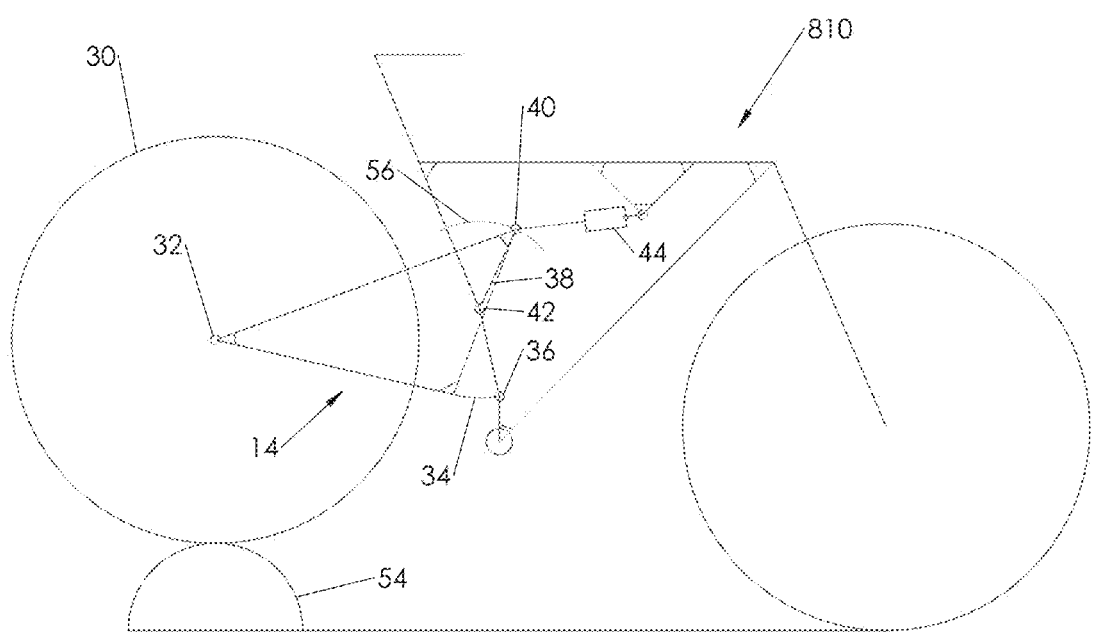
FIG. 10 is a schematic representation of the bicycle frame of FIG. 8 with the rear frame portion in a fully pivoted position about the pivot relative to the front frame portion.
Figure 11:
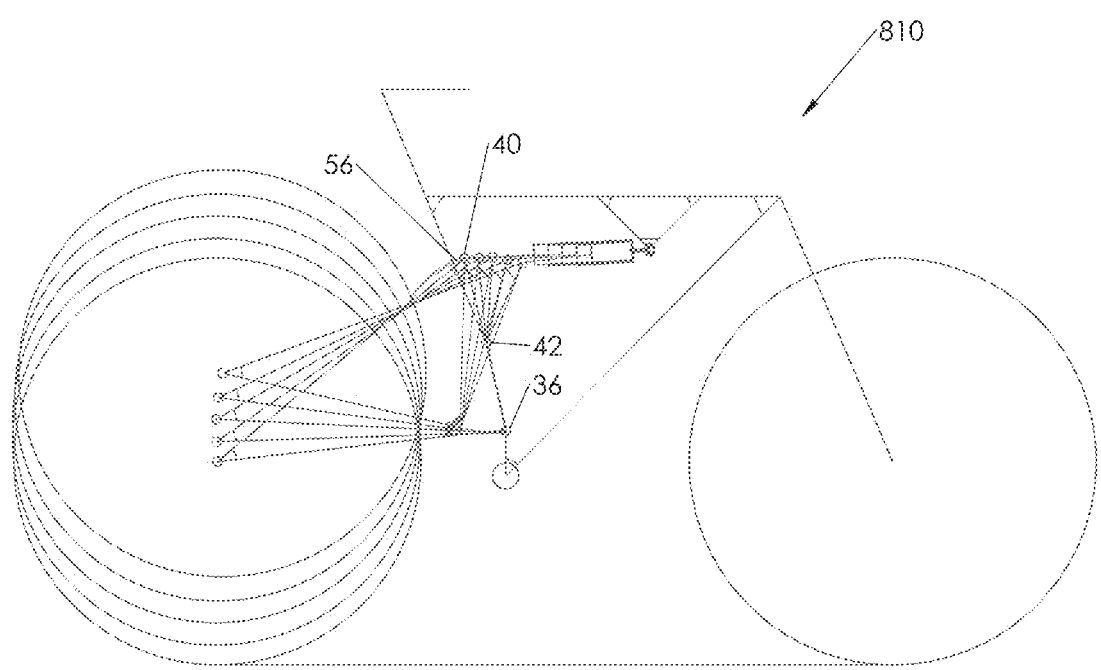
FIG. 11 is a schematic representation of the bicycle frame of FIG. 8 illustrating an arc of travel of a floating pivot as the rear suspension travels from a rest to a fully pivoted position.

FIGS. 8-11 depicts a second embodiment of a bicycle frame 810 having a rear suspension with a flexing frame segment 34 having a configuration of the pivots and the frame segment 34 to provide a spring force opposing rotation of the rear frame portion 14 about the third pivot 36 from a rest position to a fully pivoted position. FIG. 8 illustrates the rear suspension in a rest position. In this position the first pivot 40 is linearly aligned with the second pivot 42 and the third pivot 36 at the rest position. In addition, the frame segment 34 is un-flexed and thus applies no spring force to the suspension system. As the rear frame portion 14 rotates clockwise, the frame segment 34 flexes, and imparts a spring force resisting rotation of the rear frame portion 14, as illustrated in FIG. 9. This flexing continues as the rear frame portion 14 rotates clockwise until the fully pivoted position illustrated in FIG. 10. As shown in FIG. 10, the frame segment 34 is further flexed at this point.

Figure 12:
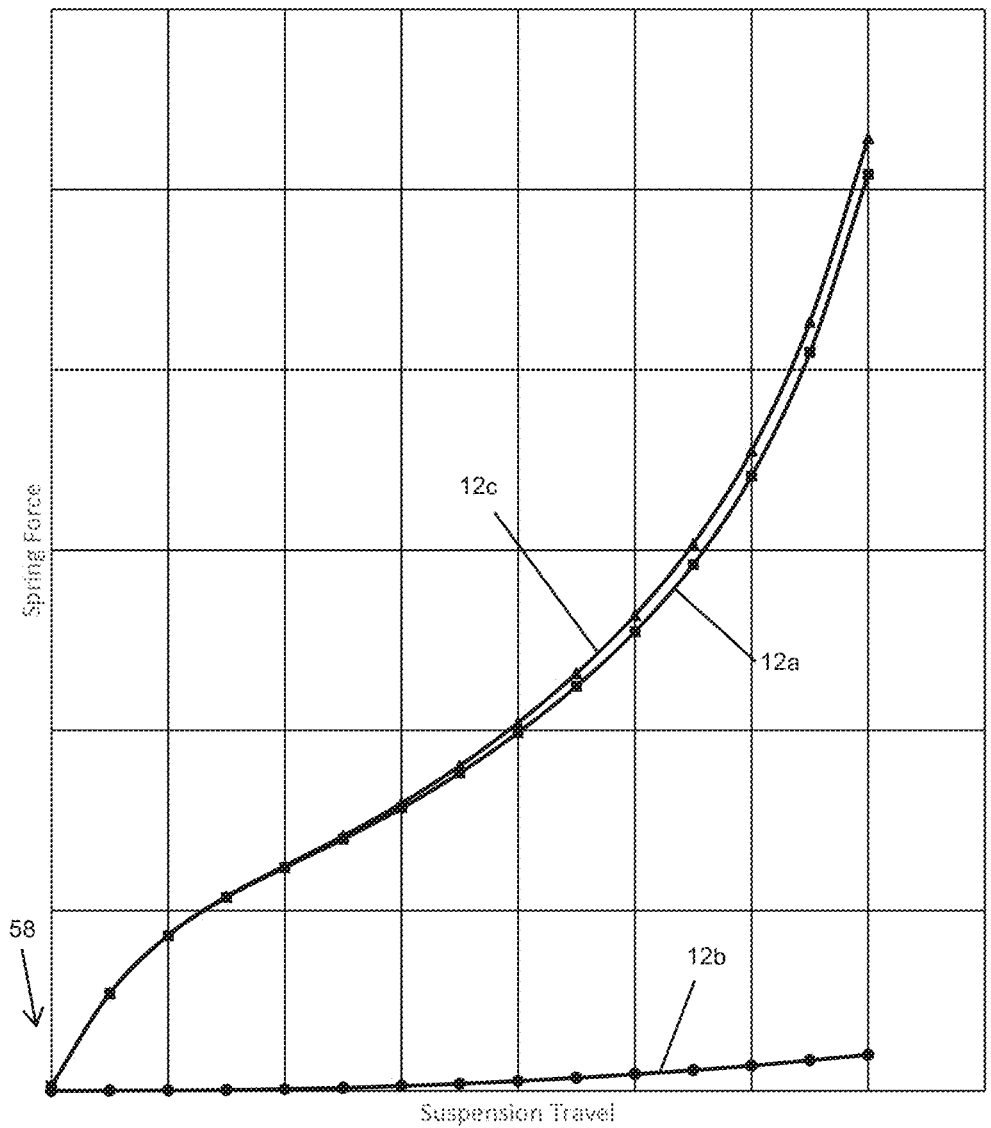
FIG. 12 is a graph showing spring force versus suspension travel curves of the second embodiment provided by the shock only, the frame segment only and the combination of shock absorber and the frame segment.

FIG. 12 illustrates the effect of the spring force applied by the frame segment 34 to the rear suspension. Curve 12a shows the spring force as a function of suspension travel of the shock absorber only. Curve 12b shows the spring force applied to the rear suspension by the frame segment 34 alone. As can be seen in FIG. 12, this spring force starts out at zero with a frame segment 34 un-flexed in a rest position and increases as the suspension travels to its fully pivoted position. Curve 12c shows the combined spring force of the shock absorber 44 and the frame segment 34.

Figure 13:
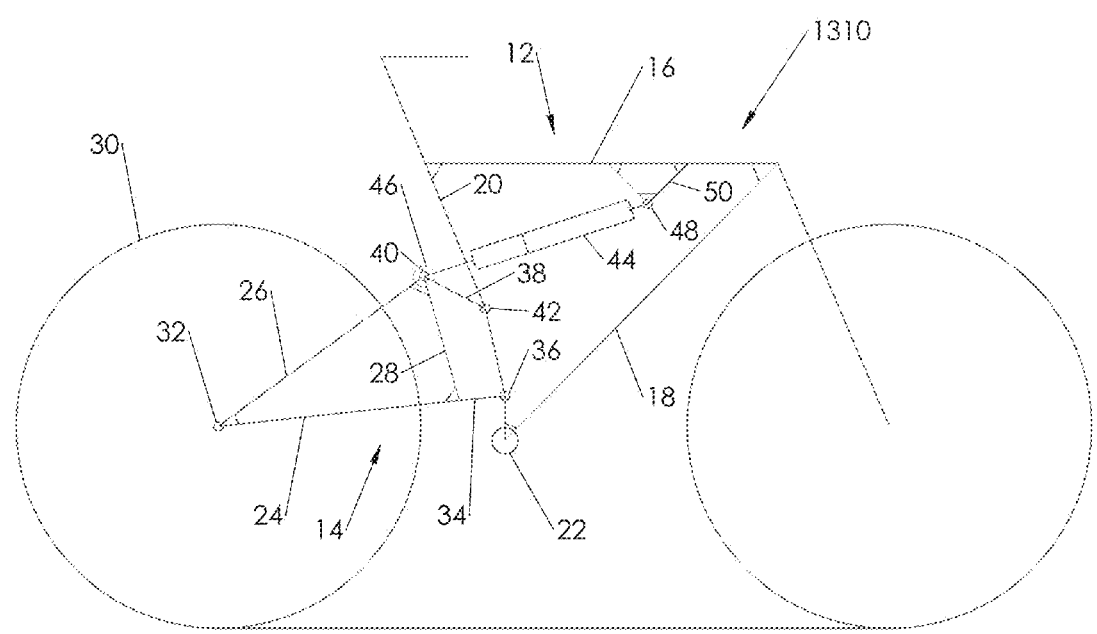
FIG. 13 is a schematic right side elevation view of a third embodiment of a bicycle frame having a rear suspension with the flexing segment shown in a rest position.
Figure 14:
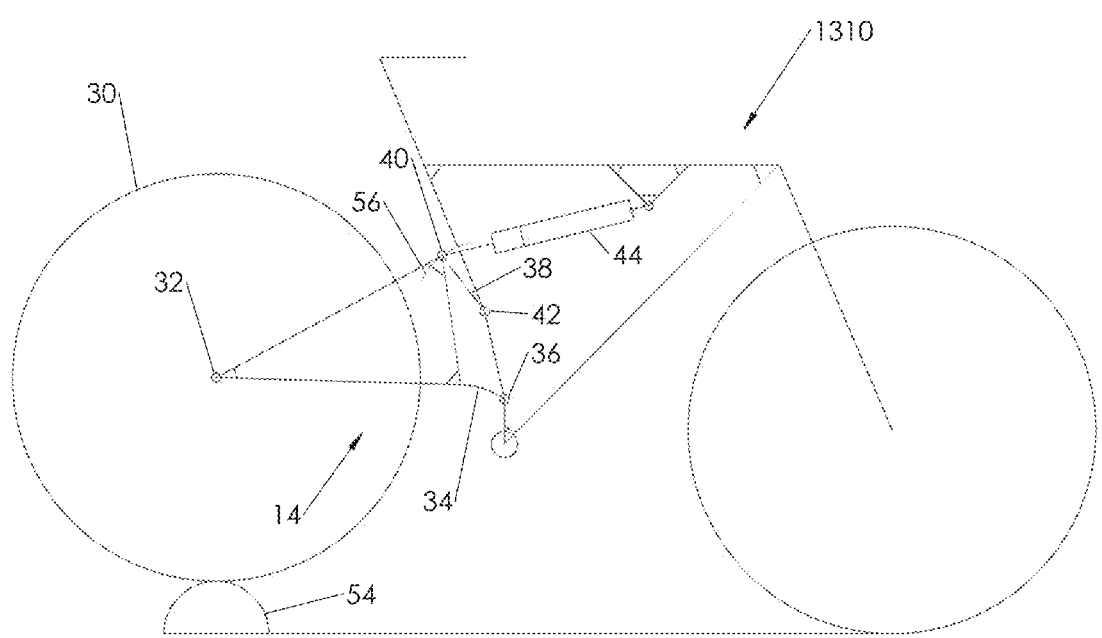
FIG. 14 is a schematic representation of the bicycle frame of FIG. 13 with the rear frame partially pivoted clockwise about a pivot relative to the front frame portion.
Figure 15:
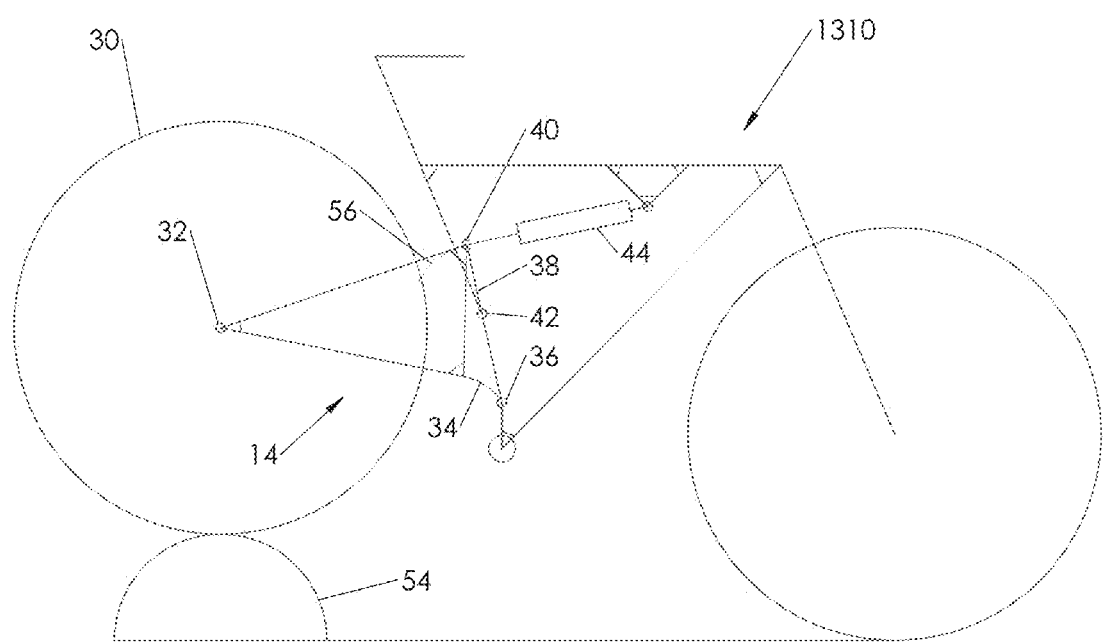
FIG. 15 is a schematic representation of the bicycle frame of FIG. 13 with the rear frame portion in a fully pivoted position about the pivot relative to the front frame portion.
Figure 16:
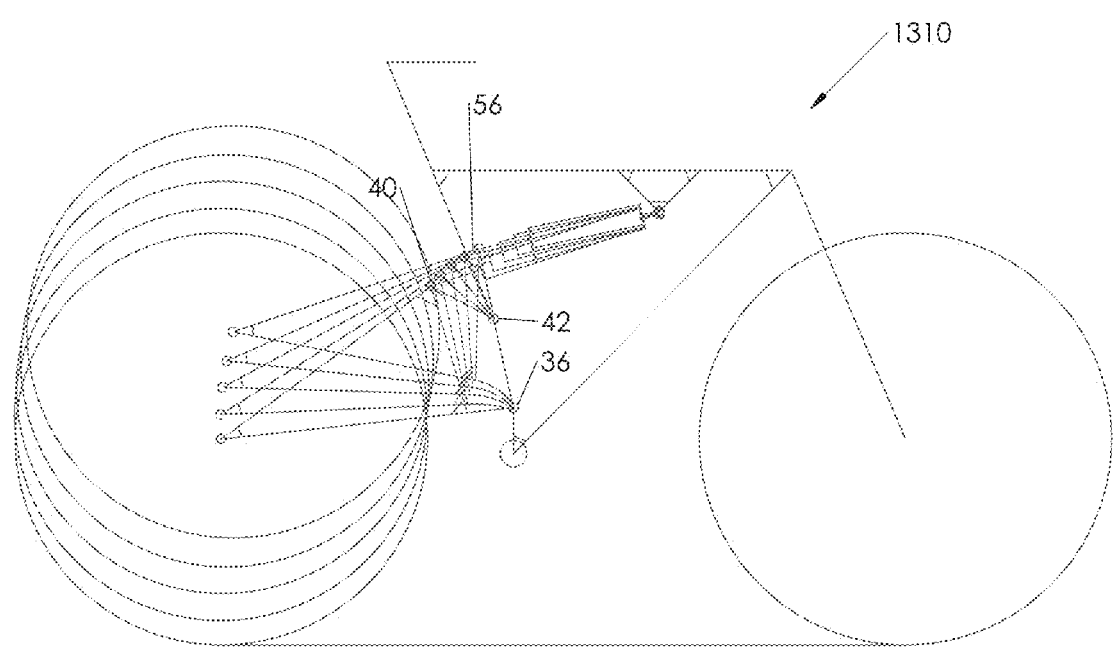
FIG. 16 is a schematic representation of the bicycle frame of FIG. 13 illustrating an arc of travel of a floating pivot as the rear suspension travels from a rest to a fully pivoted position.

FIGS. 13-16 depict a third embodiment of a bicycle frame 1310 rear suspension with a flexing frame segment 34 having a configuration of the pivots and the frame segment 34 to provide a spring force opposing rotation of the rear frame portion 14 about the third pivot 36 from a rest position to a fully pivoted position. Referring to FIG. 13, in the third embodiment, the first pivot 40 in a rest position is disposed further counterclockwise than the first pivot 40 in the first embodiment illustrated in FIGS. 1-4. The frame segment 34 is not flexed in the rest position. As the rear frame portion 14 rotates clockwise around the third pivot 36, the first pivot 40 rotates clockwise about the second pivot 42 and the frame segment 34 is flexed as seen in FIG. 14. With the rear frame portion 14 fully pivoted as depicted in FIG. 15, the first pivot 40 is linearly aligned with the second pivot 42 and the third pivot 36 to reside in a top dead center position. In addition, this further flexes the frame segment 34.

Figure 17:
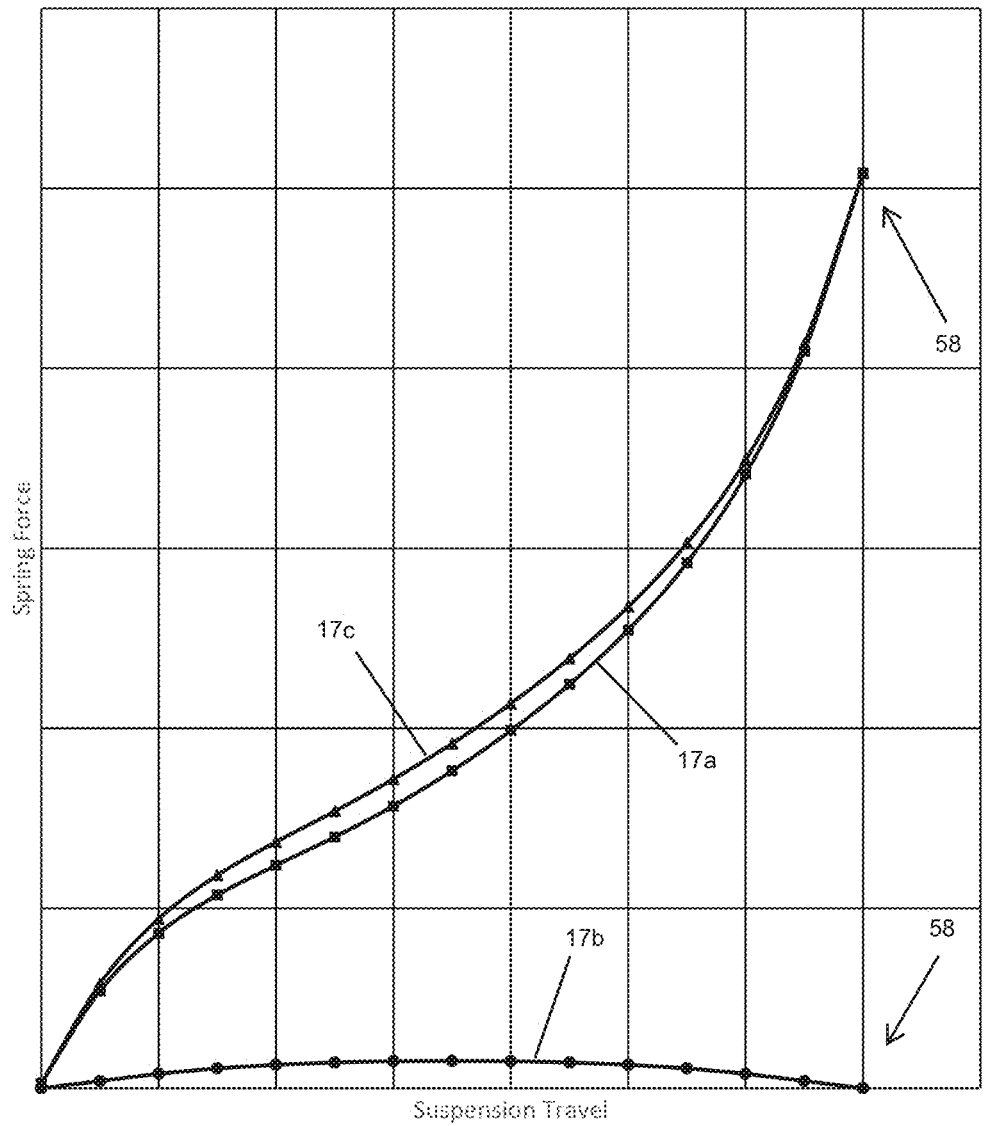
FIG. 17 is a graph showing spring force versus suspension travel curves of the third embodiment provided by the shock only, the frame segment only and the combination of shock absorber and the frame segment.

FIG. 17 depicts the spring force versus suspension travel for the third embodiment. Curve 17a illustrates the spring force applied to the suspension by the shock absorber 44 alone. Curve 17b illustrates the spring force applied to the rear suspension by the frame segment 34 alone. Curve 17b illustrates that even though the frame segment 34 is increasingly flexed as the suspension travels clockwise about the third pivot 36, the spring force applied to the suspension only increases until a midpoint in the suspension travel at which point the first pivot 40 approaches top dead center relative to the second and third pivots and the effective spring force applied by the frame segment 34 actually decreases until reaching zero as the first pivot reaches the top dead center position illustrated in FIG. 16 and the rear frame portion 14 is fully pivoted. FIG. 17c illustrates the combined spring force on the suspension from the shock absorber 44 and the frame segment 34.

Figure 18:
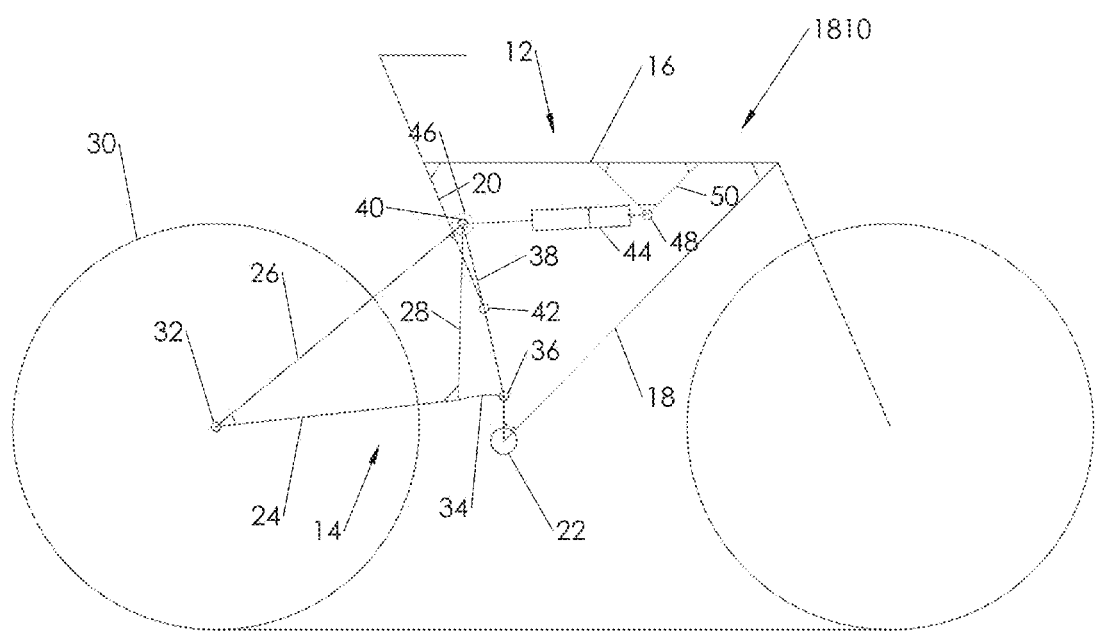
FIG. 18 is a schematic right side elevation view of a fourth embodiment of a bicycle frame having a rear suspension with the flexing segment shown in a rest position.
Figure 19:
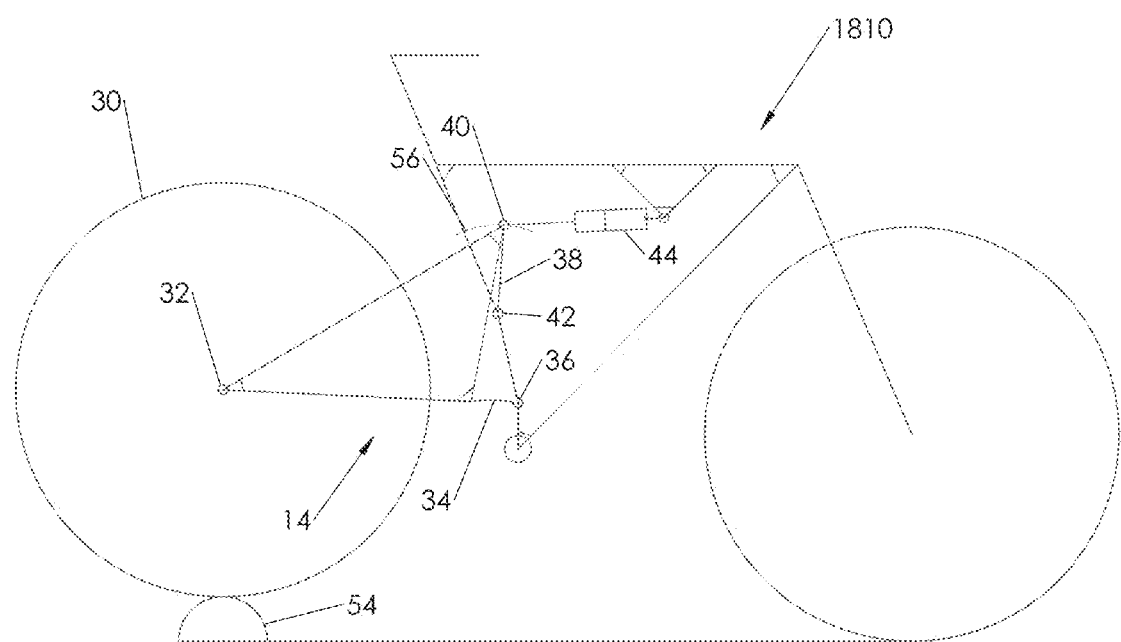
FIG. 19 is a schematic representation of the bicycle frame of FIG. 18 with the rear frame partially pivoted clockwise about a pivot relative to the front frame portion.
Figure 20:
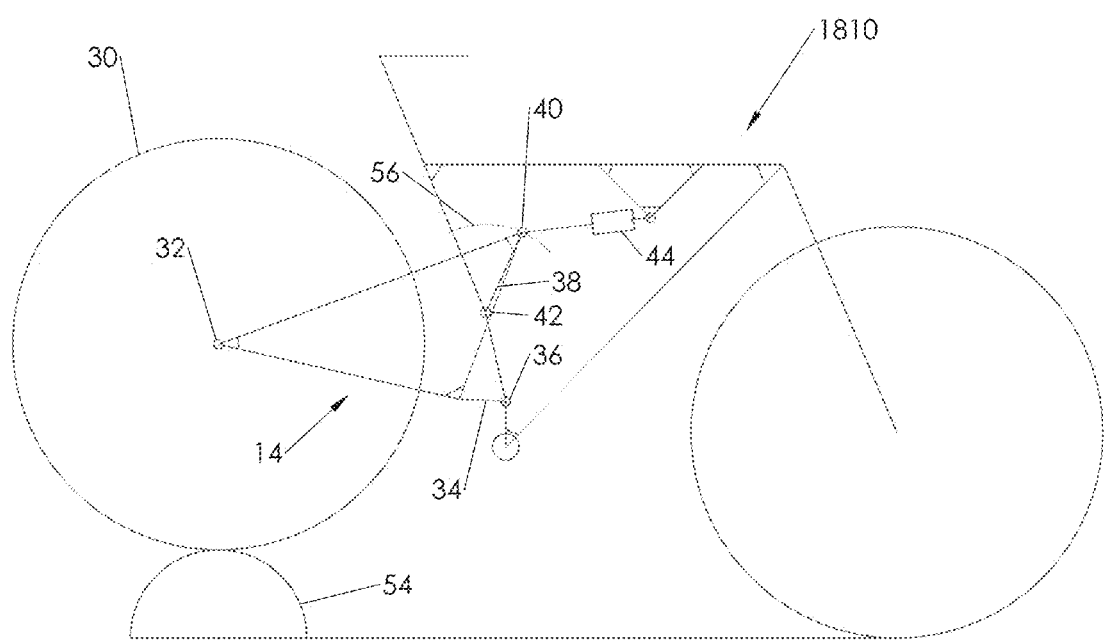
FIG. 20 is a schematic representation of the bicycle frame of FIG. 18 with the rear frame portion in a fully pivoted position about the pivot relative to the front frame portion.
Figure 21:
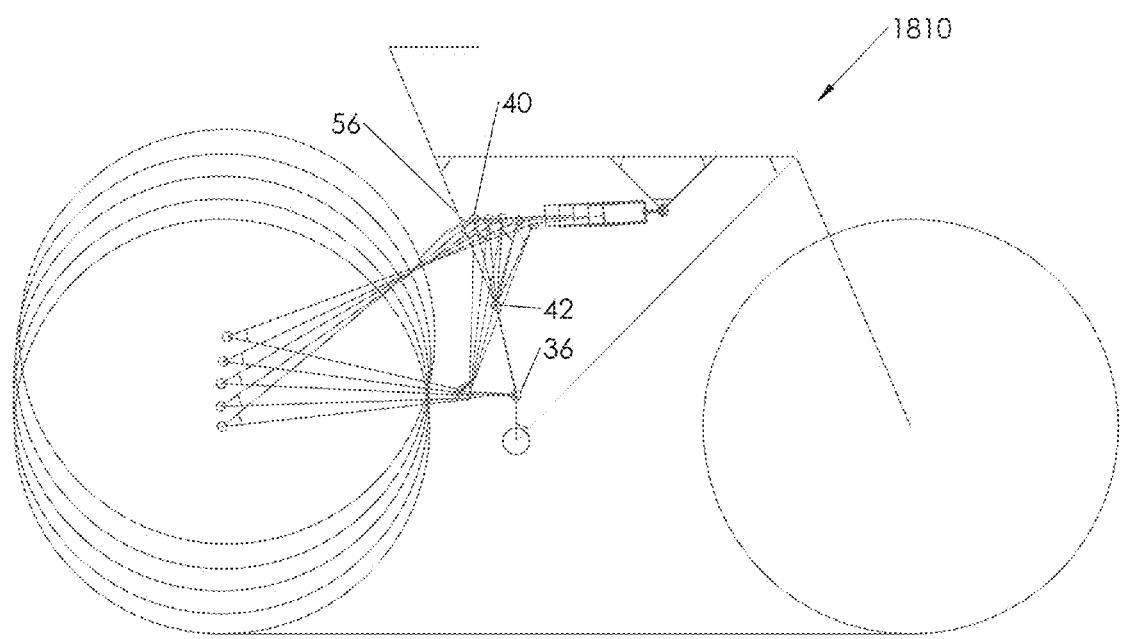
FIG. 21 is a schematic representation of the bicycle frame of FIG. 18 illustrating an arc of travel of a floating pivot as the rear suspension travels from a rest to a fully pivoted position.

FIGS. 18-21 depict a forth embodiment of a bicycle frame 1810 having a rear suspension with a flexing frame segment 34 having a configuration of the pivots and the frame segment 34 which provides a spring force promoting rotation of the rear frame portion 14 about the third pivot 36 from a rest position to a fully pivoted position. Referring to FIG. 18, in the fourth embodiment at a rest position the first pivot 40 is linearly aligned with the second pivot 42 and the third pivot 36. In other words, the first pivot 40 is at top dead center over the second pivot 42. The fourth embodiment further includes the frame segment 34 being flexed or preloaded to provide a negative spring force to the suspension, or a force promotion clockwise rotation of the suspension about the pivot 36. However, because at the rest position depicted in FIG. 18 the first pivot is at top dead center relative to the second pivot 42 and the third pivot 36, the effective spring force applied to the suspension system by the frame segment 34 is zero. As an obstacle 54 is encountered by the rear wheel, the rear suspension is rotated clockwise about the pivot 36 as illustrated in FIG. 19. Once moved off top dead center, the frame segment serves to promote rotation of the rear frame portion 14 about the pivot 36 because its flex begins to diminish. When the rear frame portion 14 is fully rotated about the pivot 36 as illustrated in FIG. 20, the frame segment 34 is straight (un-flexed) and no longer provides a spring force on the rear suspension.

Figure 22:
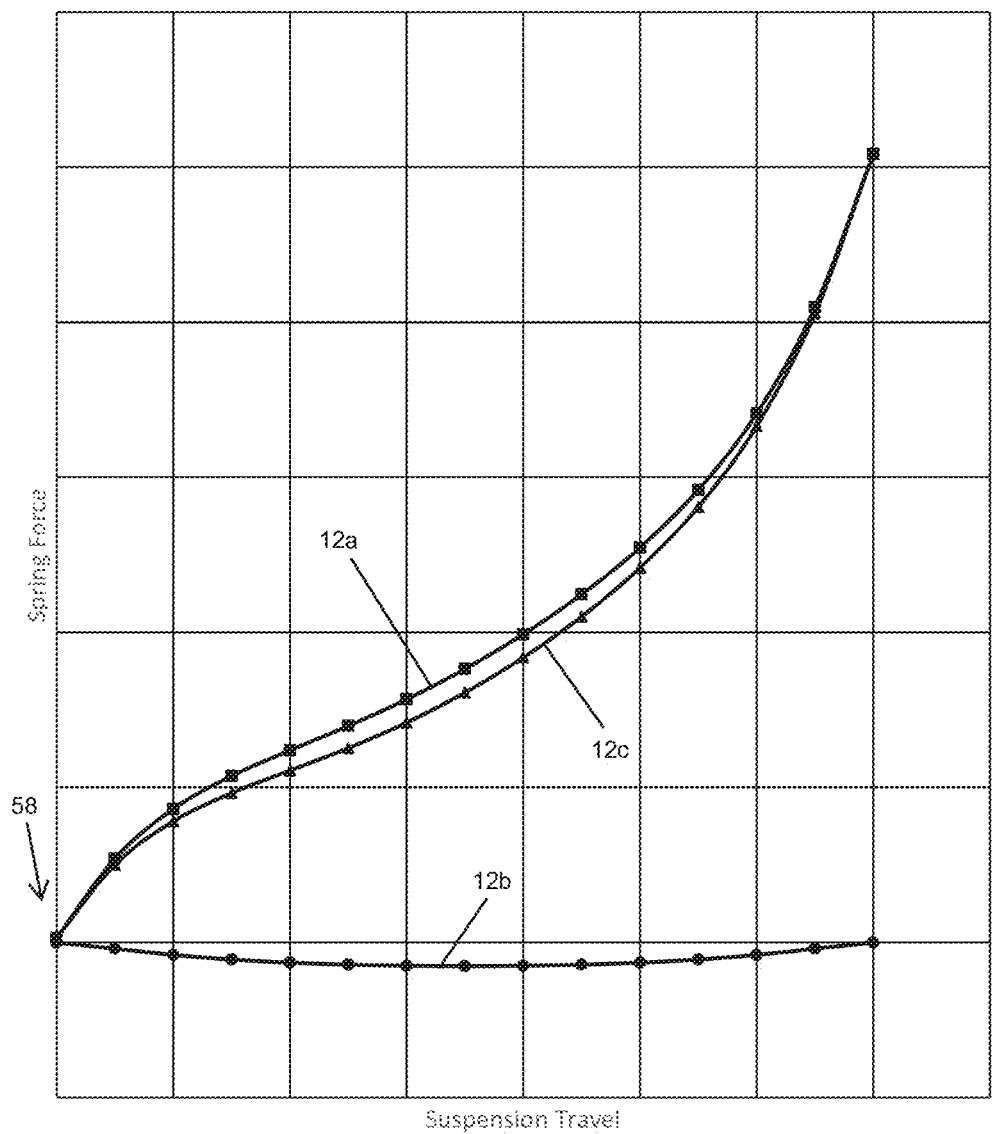
FIG. 22 is a graph showing spring force versus suspension travel curves of the fourth embodiment provided by the shock only, the frame segment only and the combination of shock absorber and the frame segment.

The spring force curves of the frame segment 34 and the shock absorber 44 as a function of suspension travel for the fourth embodiment is illustrated in FIG. 22. Curve 12a shows the spring force applied to the rear suspension by the shock absorber 44 alone. Curve 12b shows the spring force applied to the rear suspension by the frame segment 34 alone. Curve 12b illustrates how the frame segment 34 is configured to promote rotation of the rear suspension as soon as the first pivot 40 moves off top dead center of the second pivot 42 with that spring force promoting clockwise pivoting until the shock absorber 44 is completely compressed and the rear frame portion 14 is fully pivoted, at which time the frame segment is straight and applies no spring force. Curve 12c shows the combined effect of the spring force applied to the rear suspension by the shock absorber 44 and the frame segment 34 over the course of the suspension travel.

Figure 23:
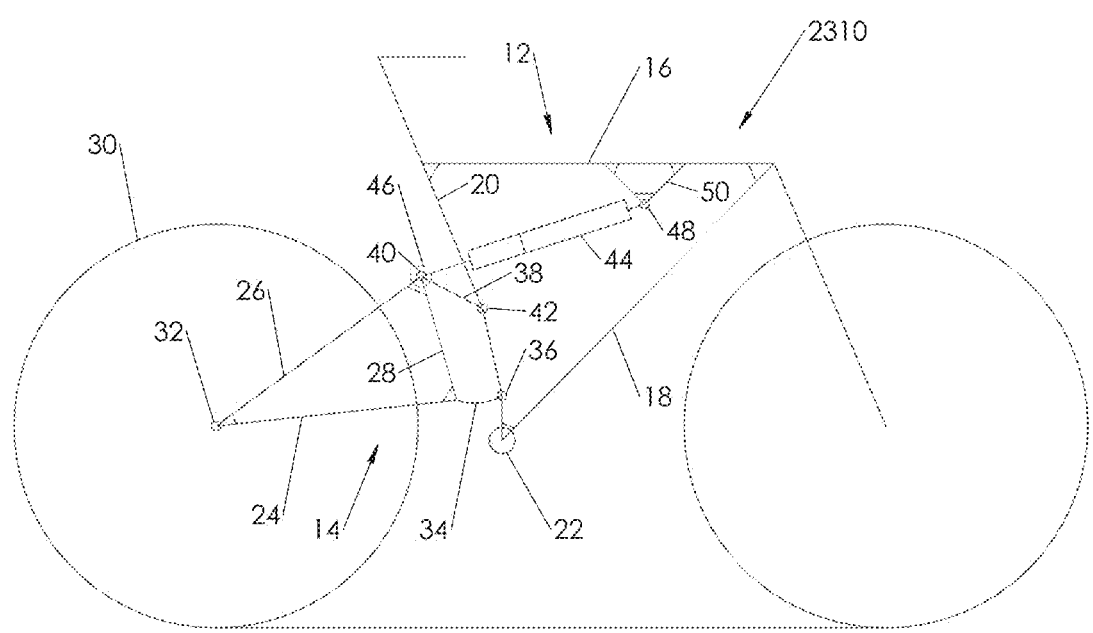
FIG. 23 is a schematic right side elevation view of a fifth embodiment of a bicycle frame having a rear suspension with the flexing segment shown in a rest position.
Figure 24:
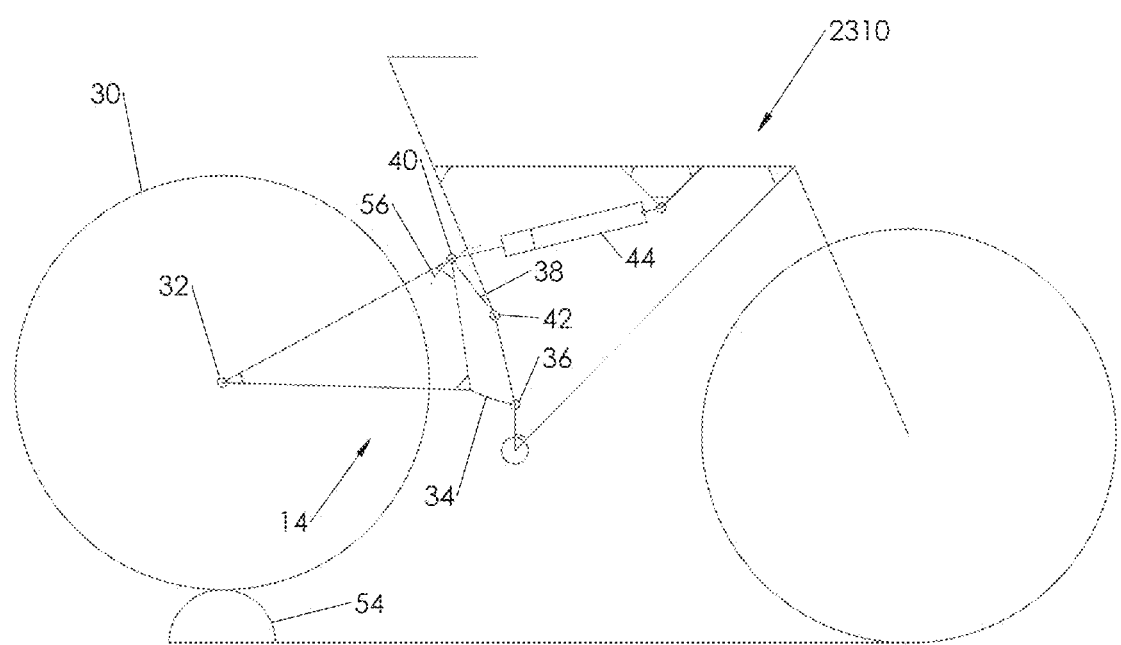
FIG. 24 is a schematic representation of the bicycle frame of FIG. 23 with the rear frame partially pivoted clockwise about a pivot relative to the front frame portion.
Figure 25:
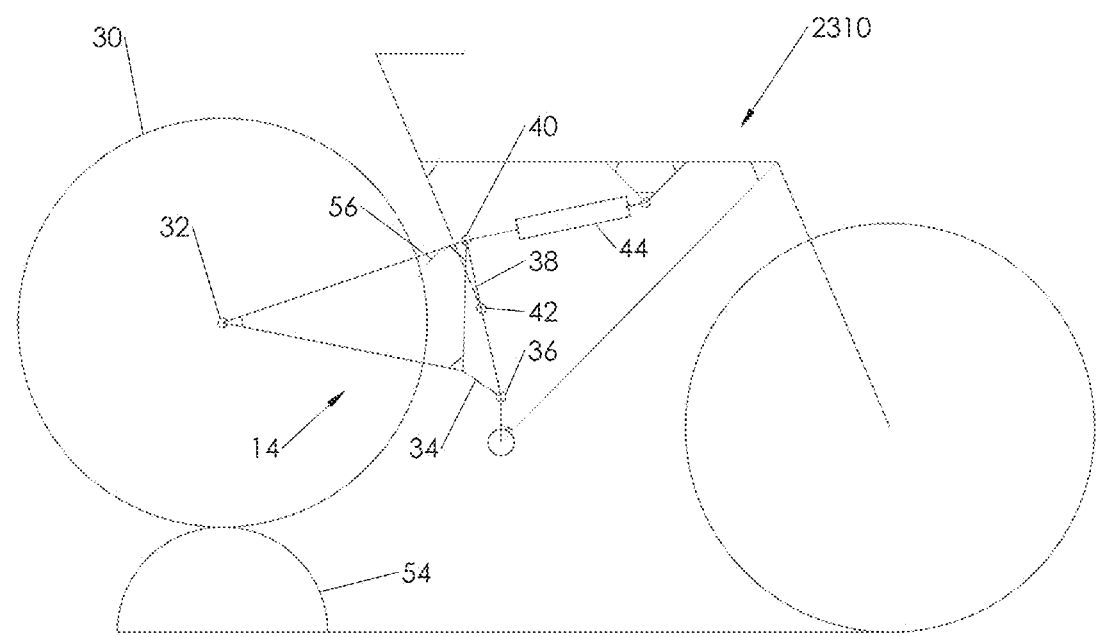
FIG. 25 is a schematic representation of the bicycle frame of FIG. 23 with the rear frame portion in a fully pivoted position about the pivot relative to the front frame portion.
Figure 26:
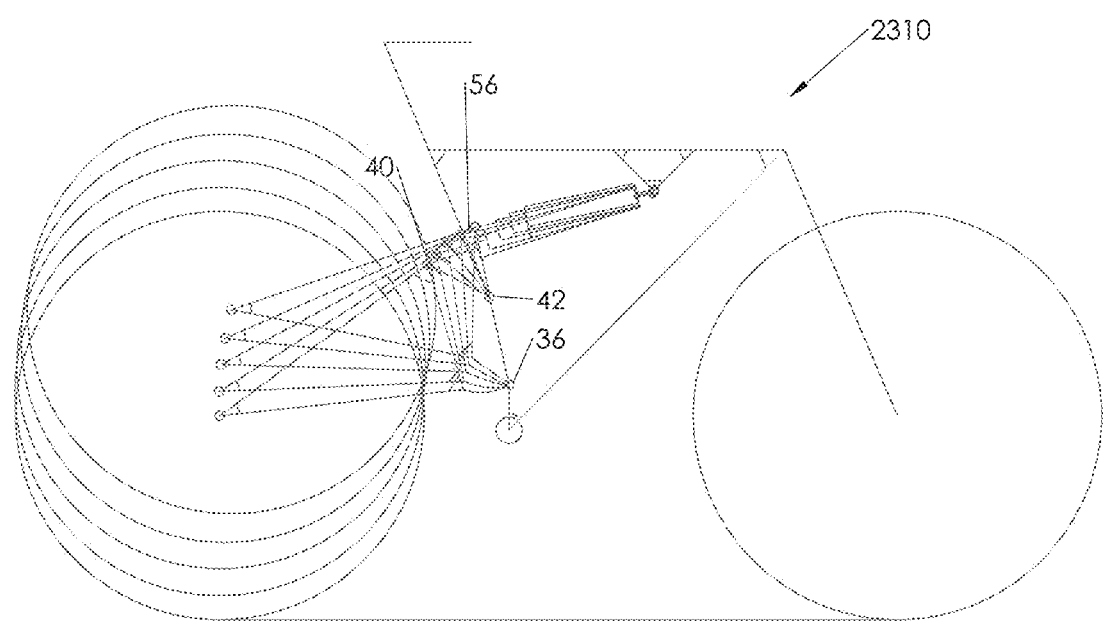
FIG. 26 is a schematic representation of the bicycle frame of FIG. 23 illustrating an arc of travel of a floating pivot as the rear suspension travels from a rest to a fully pivoted position.

FIGS. 23-26 depict a fifth embodiment of a bicycle frame 2310 having a rear suspension with a frame segment 34 having a configuration of the pivots and the frame segment 34 which provides a spring force promoting rotation of the rear frame portion 14 about the third pivot 36 from a rest position to a fully pivoted position. Referring to FIG. 23, in the fifth embodiment 2310, the first pivot 40 in a rest position is disposed further clockwise than the first pivot 40 in the first embodiment illustrated in FIGS. 1-4, however, the frame segment 34 is flexed in the rest position. As the rear frame portion 14 rotates clockwise around the third pivot 36, the first pivot 40 rotates clockwise about the second pivot 42 and the frame segment 34 begins to un-flex as seen in FIG. 24. With the rear frame portion 14 fully pivoted as depicted in FIG. 15, the first pivot 40 is linearly aligned with the second pivot 42 and the third pivot 36 to reside in a top dead center position. With the first pivot 40 in a top dead center position and the frame segment 34 completely un-flexed, the frame segment 34 no longer applies any spring force to the rear suspension.

Figure 27:
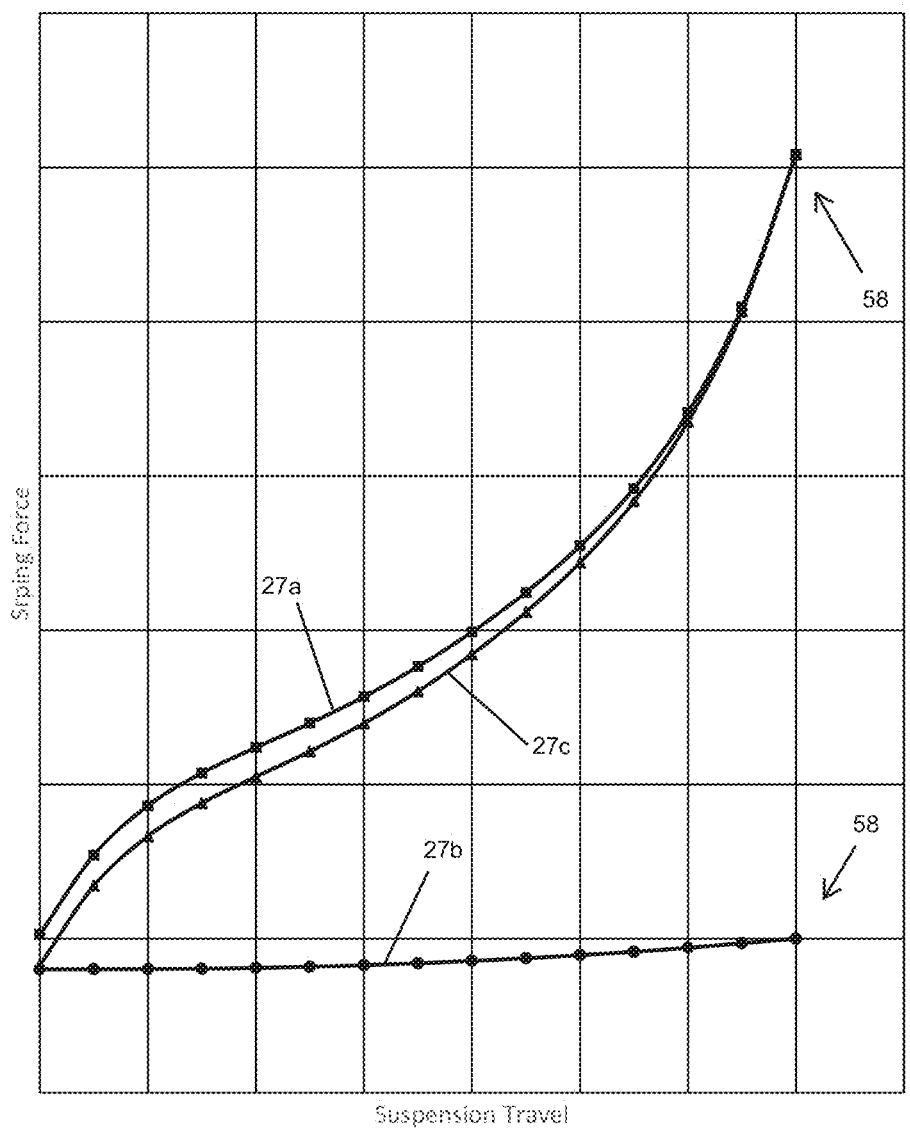
FIG. 27 is a graph showing spring force versus suspension travel curves of the fifth embodiment provided by the shock only, the frame segment only and the combination of shock absorber and the frame segment.
Figure 28:
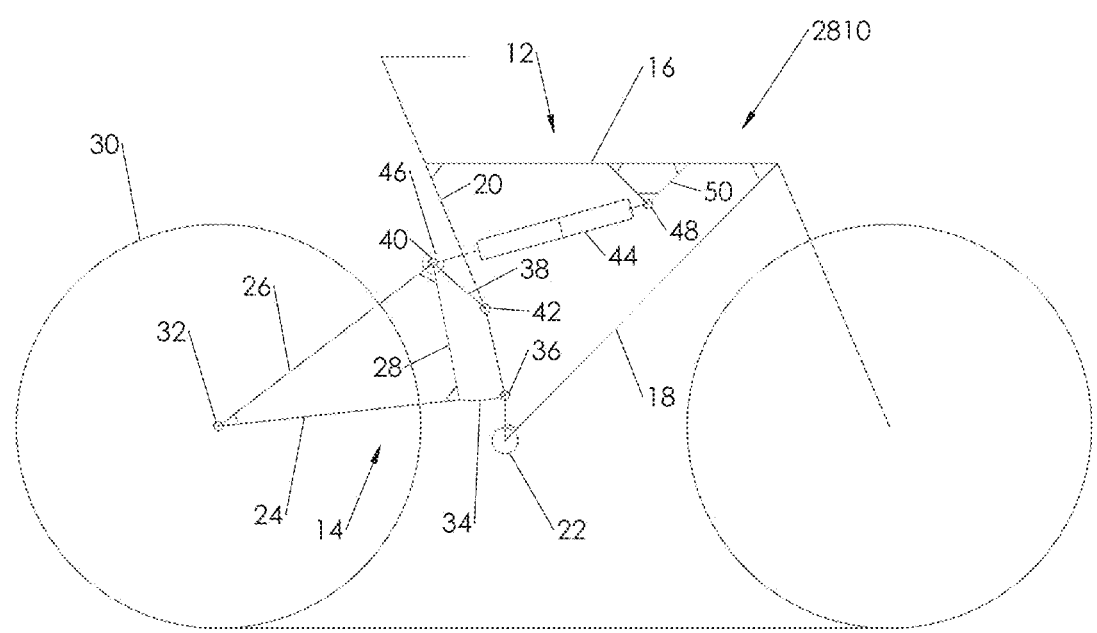
FIG. 28 is a schematic right side elevation view of a sixth embodiment of a bicycle frame having a rear suspension with the flexing segment shown in a rest position.
Figure 29:
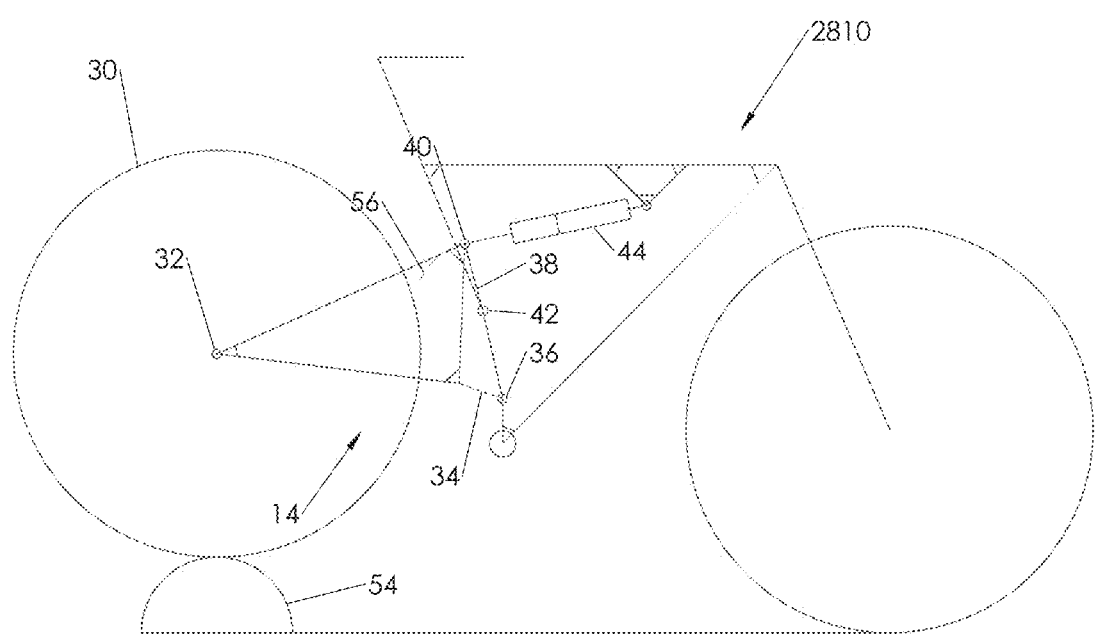
FIG. 29 is a schematic representation of the bicycle frame of FIG. 28 with the rear frame partially pivoted clockwise about a pivot relative to the front frame portion.

FIG. 27 depicts the spring force versus suspension travel for the fifth embodiment. Curve 27a illustrates the spring force applied to the suspension by the shock absorber 44 alone. Curve 27b represents the spring force applied to the rear suspension by the frame segment 34 alone. Curve 27c represents the combined spring force applied to the rear suspension by the shock absorber 44 and the frame segment 34 over the course of the suspension travel.

Figure 30:
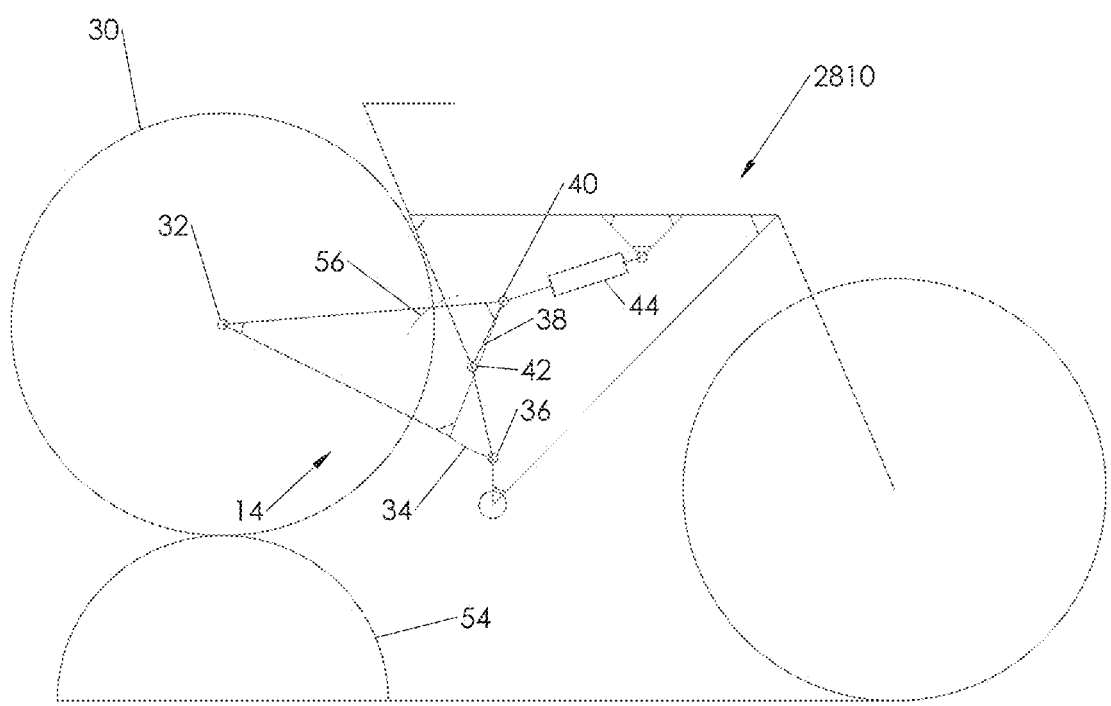
FIG. 30 is a schematic representation of the bicycle frame of FIG. 28 with the rear frame portion in a fully pivoted position about the pivot relative to the front frame portion.
Figure 31:
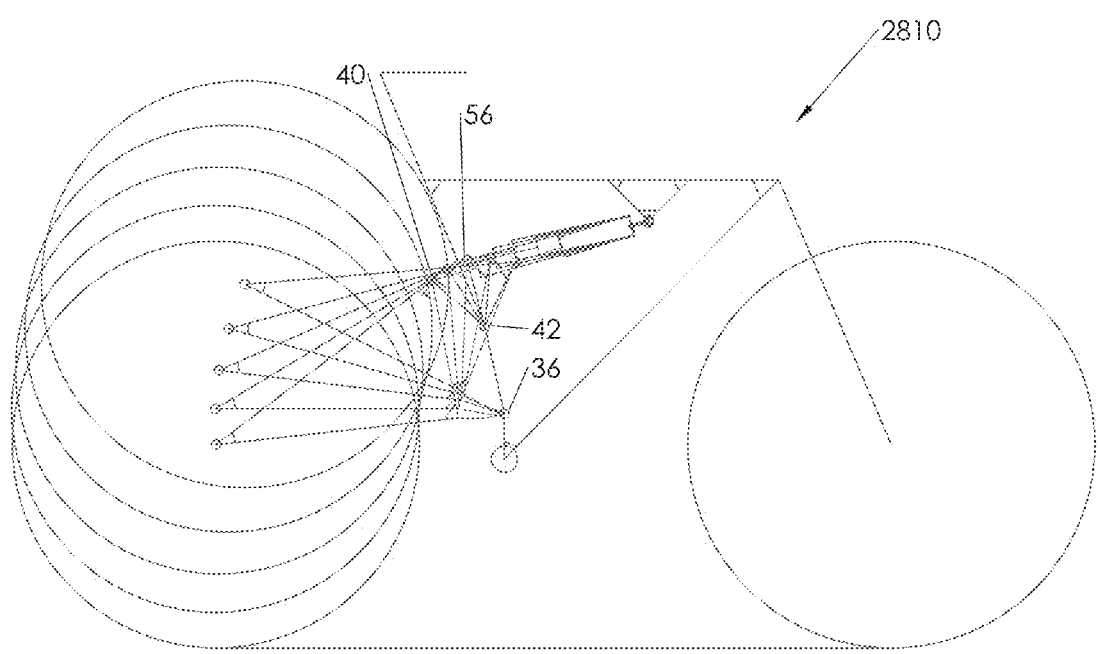
FIG. 31 is a schematic representation of the bicycle frame of FIG. 28 illustrating an arc of travel of a floating pivot as the rear suspension travels from a rest to a fully pivoted position.

FIGS. 28-31 depict a sixth embodiment of a bicycle frame 2810 having a rear suspension with a frame segment 34 having configuration of the pivots and the frame segment 34 providing a spring force promoting rotation of the rear frame portion 14 about the third pivot 36 from a rest position to a select point along the arc 56 and thereafter a spring force opposing rotation of the rear frame portion 14. The sixth embodiment of the bicycle frame 2810 is identical to the first embodiment 10 illustrated in FIGS. 1-4 with the exception that the frame segment 34 is flexed in the rest position illustrated in FIG. 28. When the first pivot 40 reaches the top dead center position illustrated in FIG. 29, the frame segment 34 is un-flexed. As the rear frame portion 14 is pivoted further in a clockwise direction, the frame segment 34 begins to flex, with its maximum flex with the rear frame portion 14 fully pivoted as illustrated in FIG. 30.

Figure 32:
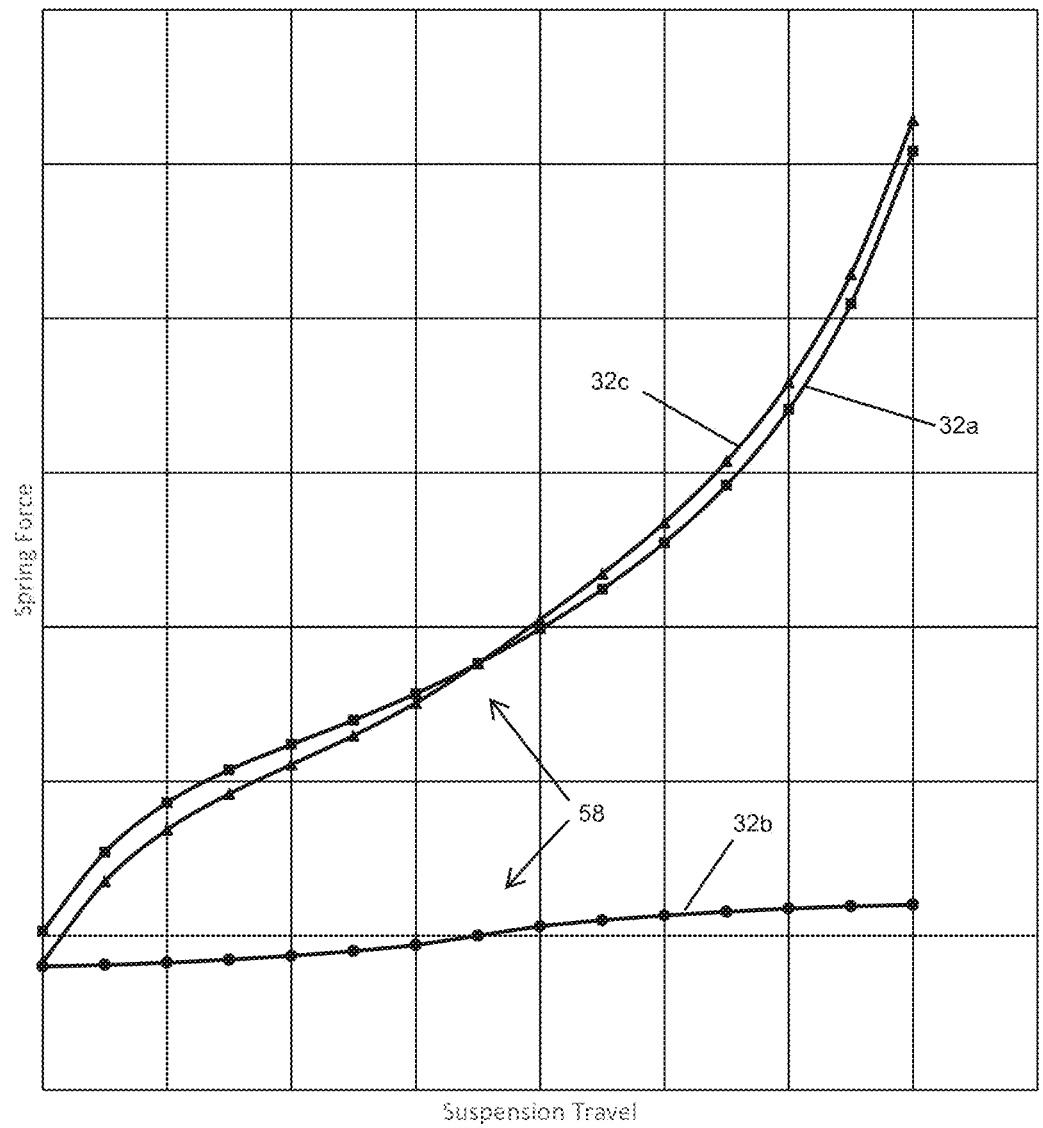
FIG. 32 is a graph showing spring force versus suspension travel curves of the sixth embodiment provided by the shock only, the frame segment only and the combination of shock absorber and the frame segment.

The spring force curves of the frame segment 34 and the shock absorber 44 as a function of suspension travel for the sixth embodiment is illustrated in FIG. 32. Curve 32a shows the spring force applied to the suspension by the shock absorber 44 alone. Curve 32b shows the spring force applied to the rear suspension by the frame segment 34 alone. Curve 32b illustrates that at the rest position the frame segment 34 imparts a spring force promoting rotation of the rear frame portion 14 about the third pivot 36. With the first pivot 40 at top dead center relative to the second pivot 42 and the third pivot 36, the frame segment 34 is un-flexed and thus imparts no spring force to the suspension for that reason and for the additional reason that the first pivot 40 is at top dead center. Thereafter as the rear suspension pivots further in the clockwise direction, the frame segment 34 flexes opposing clockwise rotation of the frame segment 34 until it reaches its fully pivoted position. Curve 12c shows the combined effect of the spring force applied to the rear suspension by the shock absorber 44 and the frame segment 34 over the course of the suspension travel.

Figure 33:
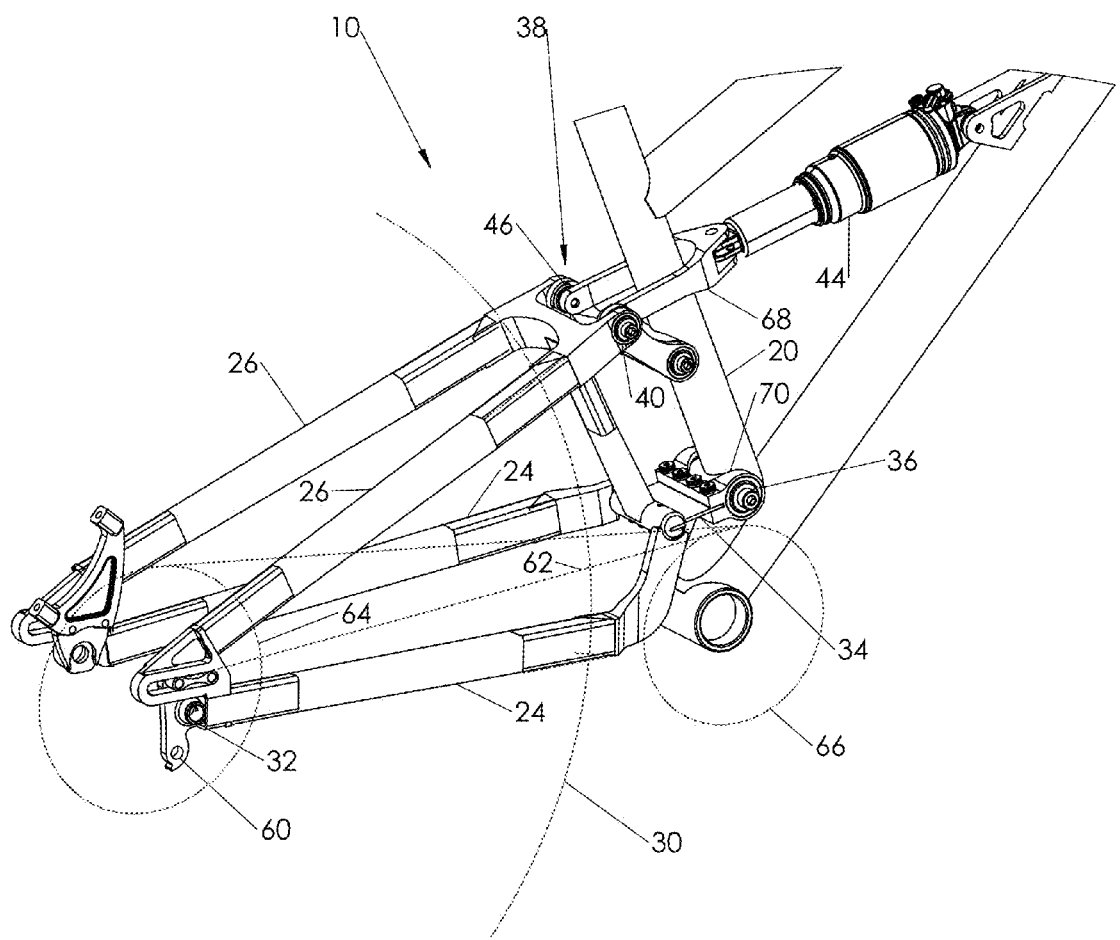
FIG. 33 is a is a perspective view of an embodiment of a bicycle frame of FIG. 1 having a rear suspension with a flexing frame segment.

FIG. 33 is a perspective view of the first embodiment of the bicycle frame 10 having the configuration depicted schematically in FIGS. 1-4 showing the rear frame portion 14 comprising a pair of spaced seat stays 26 and a pair of spaced chain stays 24 configured to receive a bicycle wheel 30 therebetween. FIG. 33 further illustrates the axle housing 32 for receiving an axle of the wheel 30 and a derailleur hanger 60 for attaching a derailleur for shifting the position of a chain 62 along a rear cassette 64. FIG. 33 also depicts a front chain ring 66 which is attached a crank (not shown) that rotates about a bottom bracket (not shown) received in the bottom bracket shell 22. In the embodiment illustrated in FIG. 33, the link 38 comprises a pair of link arms attached to distal ends of the seat stays 26 at the first pivot 40 and the shock absorber 44 is attached to the first shock pivot 46 by a yoke 68 bridging the seat tube 20. In this embodiment the flexible frame segment 34 is a metal plate fixedly attached to the rear frame portion 12 and bolted to a pivoting bracket 70 pivotably connected to the seat tube 20 by third pivot 36. Alternatively, as discussed above, the flexible frame segment 34 could be fixedly attached to the front frame portion 14 and bolted to a pivoting bracket pivotably connected to the rear frame portion 12 near the bottom of the bridge stay.

Figure 34:
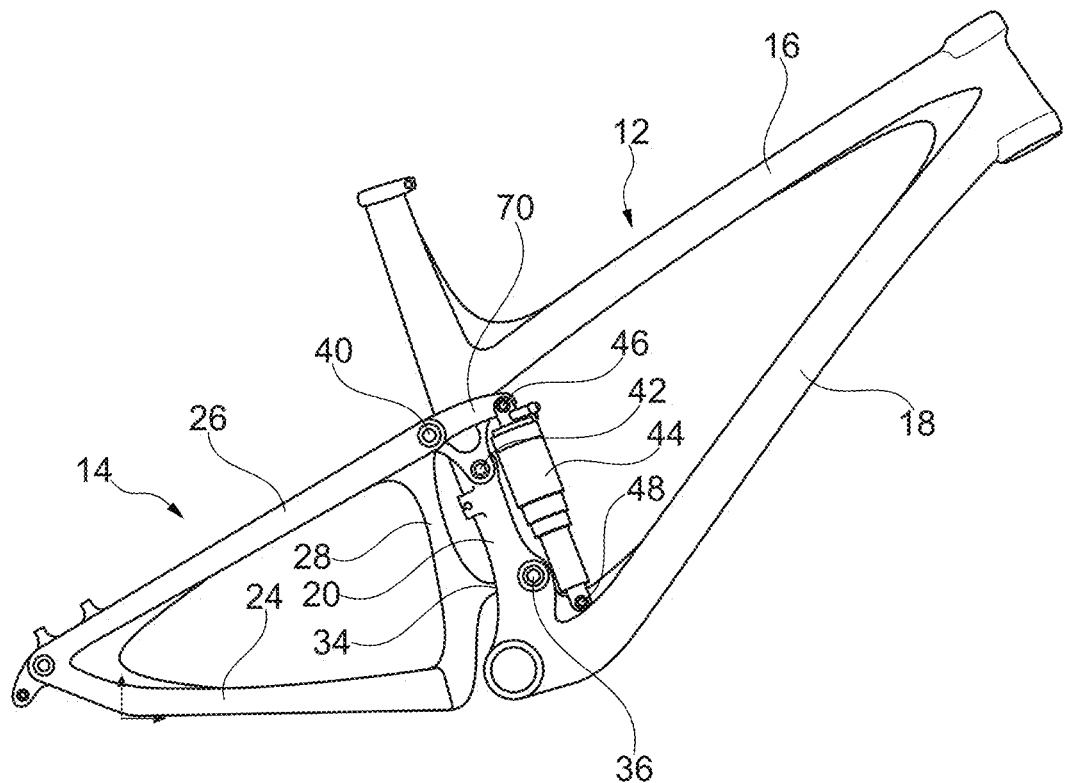
FIG. 34 is a right side view of an alternate embodiment of a bicycle frame of FIG. 1 having a rear suspension with a flexing frame segment.

FIG. 34 is an alternate embodiment of the first embodiment of the bicycle frame 10 having a rear suspension with a flexing frame segment depicted schematically in FIGS. 1-4. In this alternate embodiment the link 38 is in the form of a bell crank 70 which is a single integral piece and the shock 44 is disposed parallel to the seat tube 20, with all like elements of the embodiment of FIGS. 1-4 having like reference numbers in the alternate embodiment of FIG. 34.

The description of the various embodiments has been presented for purposes of illustration and description, but is not intended to be exhaustive or limiting of the invention to the form disclosed. The scope of the present invention is limited only by the scope of the following claims. Many modifications and variations will be apparent to those of ordinary skill in the art. The embodiments described and shown in the figures were chosen and described in order to explain the principles of the invention, the practical application, and to enable others of ordinary skill in the art to understand the invention for various embodiments with various modifications as are suited to the particular use contemplated. All references cited herein are incorporated in their entirety by reference.

What is claimed is:

1. A bicycle frame comprising:
    a substantially rigid front frame portion;
    a substantially rigid rear frame portion comprising at least one seat stay rigidly connected at a proximal end to a proximal end of at least one chain stay each of which are rigidly connected to at least one bridge stay at their distal ends in the form of a triangle;
    a link connected to the rear frame portion by a first pivot and connected to the front frame portion by a second pivot; and
    a frame segment rigidly connected at a first end to one of the rear frame portion or the front frame portion and pivotably connected at a second end to the other of the rear frame portion and the front frame portion by a third pivot, the frame segment being flexible proximate the second end.

2. The bicycle frame of claim 1 wherein the frame segment comprises
    a leaf spring proximate the second end.

3. The bicycle frame of claim 1 wherein the frame segment is substantially parallel and aligned with an imaginary line between the junction between the seat stay and the chain stay and the third pivot.

4. The bicycle frame of claim 1 wherein the seat stay and the chain stay comprise forked stay pairs configured to receive a bicycle wheel therebetween.

5. The bicycle frame of claim 1 further comprising a shock absorber pivotably connected between the link and the front frame portion to oppose pivoting of the rear frame portion relative to the front frame portion in a clockwise direction about the third pivot.

6. The bicycle frame of claim 1 wherein the first pivot floats in an arc about the second pivot which is fixed relative to front frame portion as the rear frame portion pivots relative to the front frame portion about the third pivot, and wherein the frame segment flexes to enable the first pivot to move in the arc about the second pivot as the frame segment pivots about the third pivot between a rest position and a fully pivoted position.

7. The bicycle frame of claim 6 wherein the frame segment behaves as a leaf spring as it flexes, the pivots and the frame segment being configured so that the frame segment provides a spring force that varies between opposing and promoting pivoting of the rear frame portion about the third pivot as the rear frame portion is pivoted about the third pivot from a rest position to a fully pivoted position.

8. The bicycle frame of claim 6 wherein the frame segment behaves as a leaf spring as it flexes, the pivots and the frame segment being configured so that the frame segment provides a spring force opposing rotation of the rear frame portion about the third pivot from a rest position to a fully pivoted position.

9. The bicycle frame of claim 6 wherein the frame segment behaves as a leaf spring as it flexes, the pivots and the frame segment being configured so that the frame segment provides a spring force promoting rotation of the rear frame portion about the third pivot from a rest position to a fully pivoted position.

10. The bicycle frame of claim 7 wherein the frame segment is disposed between rear and front frame portions to provide a spring force opposing rotation of the rear frame portion about the third pivot from a rest position to a point along the travel of the arc of the first pivot about the second pivot and to thereafter provide a spring force promoting rotation of the rear frame portion about the third pivot to a fully pivoted position.

11. The bicycle frame of claim 7 wherein the frame segment is disposed between rear and front frame portions to provide a spring force promoting rotation of the rear frame portion about the third pivot from a rest position to a point along the travel of the arc of the first pivot about the second pivot and to thereafter provide a spring force opposing rotation of the rear frame portion about the third pivot to a fully pivoted position.

12. The bicycle frame of claim 1 wherein the frame segment is integrally formed with the one of the rear frame portion or the front frame portion to which it is rigidly connected.

13. The bicycle frame of claim 1 wherein the frame segment comprises a leaf spring configured to be substantially laterally rigid.

14. The bicycle frame of claim 13 wherein the leaf spring is made of a metal.

15. The bicycle frame of claim 13 wherein the leaf spring is made of composite material.

16. The bicycle frame of claim 13 wherein the leaf spring is integrally formed with the one of the rear frame portion or the front frame portion to which it is rigidly connected.

17. The bicycle frame of claim 1 wherein the frame segment is attached by a fastener to the one of the rear frame portion or the front frame portion to which it is rigidly connected.

18. The bicycle frame of claim 1 wherein the rear frame portion and the front frame portion are made of composite material and the frame segment is made of composite material integrally formed with the one of the rear frame portion or the front frame portion to which it is rigidly connected.

\* \* \* \* \*